US007006456B2

(12) United States Patent
Rabipour et al.

(10) Patent No.: US 7,006,456 B2
(45) Date of Patent: Feb. 28, 2006

(54) METHOD AND APPARATUS FOR PACKET-BASED MEDIA COMMUNICATION

(75) Inventors: Rafi Rabipour, Côte St-Luc (CA); Paul Coverdale, Nepean (CA); Paxton Smith, Montreal (CA)

(73) Assignee: Nortel Networks Limited, St-Laurent (CA)

( * ) Notice: Subject to any disclaimer, the term of this patent is extended or adjusted under 35 U.S.C. 154(b) by 991 days.

(21) Appl. No.: 09/986,498

(22) Filed: Nov. 9, 2001

(65) Prior Publication Data

US 2002/0105917 A1    Aug. 8, 2002

Related U.S. Application Data

(60) Provisional application No. 60/266,404, filed on Feb. 2, 2001.

(51) Int. Cl.
*H04L 12/16* (2006.01)
*H04M 3/42* (2006.01)

(52) U.S. Cl. .................................. 370/260; 379/202.01
(58) Field of Classification Search ................ 370/260, 370/401; 379/202.01
See application file for complete search history.

(56) References Cited

U.S. PATENT DOCUMENTS

| 4,031,328 A | 6/1977 | Pitroda | |
|---|---|---|---|
| 4,139,731 A | 2/1979 | Hashemi et al. | |
| 4,267,593 A * | 5/1981 | Regan et al. | 370/261 |
| 4,387,457 A | 6/1983 | Munter | |
| 4,475,190 A * | 10/1984 | Marouf et al. | 370/260 |
| 4,499,578 A | 2/1985 | Marouf et al. | |
| 4,541,087 A | 9/1985 | Comstock | |
| 4,658,398 A | 4/1987 | Hsing | |

(Continued)

FOREIGN PATENT DOCUMENTS

CA    2224541    9/1997

(Continued)

OTHER PUBLICATIONS

Forgie, J.W. and Feebrer, C.E. and Weene, P.L., "Voice Conferencing Technology Final Report", MIT Lincoln Lab, Mar. 1979, No. DDC AD-A074498, Lexington, MA.

(Continued)

*Primary Examiner*—John Pezzlo
*Assistant Examiner*—Hong Sol Cho

(57) ABSTRACT

A conference bridge is provided for managing a conference between media signal sources generating media data packets conveying encoded media information and encoding type information. The media signal sources, in order to enter a conference, generate link messages including respective supported encoding types and transmit the link messages to the conference bridge. The conference bridge receives the link messages and processes them to derive a first common encoding type supported all media signal sources in the conference and a second encoding type supported a subset of media signal sources in the conference. The conference bridge generates link message reply signals conveying the first encoding type and the second encoding type the subset of media signal sources and conveying at least the first encoding type to the media signal sources other than the subset of all media signal sources. Each media signal source is responsive to the link message reply signal to render active at least the first encoding type and selectively render active the second encoding type.

47 Claims, 11 Drawing Sheets

U.S. PATENT DOCUMENTS

| | | | |
|---|---|---|---|
| 5,272,698 A | | 12/1993 | Champion |
| 5,317,567 A | | 5/1994 | Champion |
| 5,383,184 A | | 1/1995 | Champion |
| 5,390,177 A | * | 2/1995 | Nahumi ............... 370/268 |
| 5,436,896 A | * | 7/1995 | Anderson et al. ........... 370/260 |
| 5,457,685 A | * | 10/1995 | Champion ............... 370/260 |
| 5,570,363 A | * | 10/1996 | Holm ............... 370/260 |
| 5,572,582 A | | 11/1996 | Riddle |
| 6,178,237 B1 | | 1/2001 | Horn |
| 6,185,424 B1 | | 2/2001 | Pon et al. |
| 6,606,306 B1 | * | 8/2003 | Lin et al. ............... 370/261 |
| 6,744,741 B1 | * | 6/2004 | Ju et al. ............... 370/260 |
| 6,792,092 B1 | * | 9/2004 | Michalewicz ............... 370/263 |

FOREIGN PATENT DOCUMENTS

| | | |
|---|---|---|
| EP | 0 797 337 A2 | 9/1997 |
| EP | 0 841 831 A2 | 5/1998 |
| EP | 1 107 538 A2 | 6/2001 |
| WO | WO 00/70885 | 11/2000 |

OTHER PUBLICATIONS

Forgie, James W., "Voice Conferencing in packet networks", IEEE-ICC, pp. 21.3.1-21.3.4, Jun. 1980, Seattle, Washington.

Champion, Terrence G., "Multi-speaker conferencing over narrowband channels", IEEE-MILCOM, pp. 1120-1223, Nov. 1991, Washington, D.C.

International Search Report PCT/CA02/01696; May 30, 2003.

Thom G A: "H. 323: The multimedia communications standard for local area networks" IEEE Communications Magazine, IEEE Service Center. Piscataway, N.J., U.S.A., vol. 34, No. 12, Dec. 1, 1996; XP 000636454.

Anonymous: "H. 245: Control Protocol for Multimedia Communication"; May 1999; XP002199601; URL: http://www.ihserc.com.

Written Opinion of PCT/CA02/01696.

International Preliminary Examination Report, PCT/CA02/01696, Mar. 11, 2004.

* cited by examiner

FIG. 8A

SECOND ENCODING TYPE MEMORY UNIT 510

600

| ENCODING TYPE IDENTIFIER | MEDIA SOURCE IDENTIFIER |
|---|---|
| 1 | A, B, C |
| 36 | A, B |
| 4 | A, C |

FIG. 8B

FIRST ENCODING TYPE MEMORY UNIT 506

602

| ENCODING TYPE IDENTIFIER |
|---|
| 2 |
| 6 |
| 47 |

METHOD AND APPARATUS FOR PACKET-BASED MEDIA COMMUNICATION

This application claims benefit of U.S. Provisonal Application 60/266,404 filed Feb. 2, 2001.

FIELD OF THE INVENTION

This invention relates generally to a packet-based media communication system and more specifically to media conferencing within a packet-based communication network.

BACKGROUND OF THE INVENTION

It is known to effect media conferencing by using a conference bridge. A conference bridge is a device that facilitates conferencing between multiple conference participants operating respective terminal units. In a typical interaction, the conference bridge receives a plurality of media signals from multiple conference participants and selects the participants that are determined to have the most active speech signal for transmission to the other participants of the conference.

In a packet-based communication system, the media signals are in the form of packets. The packets generally include encoded media information and header information. Typically, in such systems, the conference bridge receives the media data packets, decodes the encoded media information, and performs the selection of the most active speakers using the decoded media information on the basis of well-known methods. Following this, the conference bridge forms a mixed, composite media signal consisting of those selected media signals. The bridge forms a plurality of mixed, composite media signals, such that the signal of a given participant is either subtracted, or highly attenuated, from the composite media signal that is returned to him. The bridge then encodes the plurality media signals and forwards them to the appropriate participant of the conference. The terminal units at the participants' locations receive and decode the encoded media information and process the media information for delivery to the participants. U.S. Pat. No. 4,499,731 describes in greater detail the generating of mixed and composite media signals. The content of this document is hereby incorporated by reference.

A deficiency in systems of the type described above is, in the case where the encoding is a compression-type encoding, the degradation in the quality of the media information as the media information is encoded and decoded multiple times during the propagation of the media data packets. Another deficiency is that the encoding and decoding operations at the conference bridge require significant computing capabilities. Conference bridges and associated systems have been designed to reduce the occurrence of back-to-back (tandem) encode-decode operations. For further information regarding such conference bridges and such systems, the reader is invited to refer to the following co-pending patent applications:

U.S. patent application Ser. No. 09/475,047 entitled "Apparatus and Method for Packet-Based Media Communications" filed on Dec. 30, 1999 and assigned to the assignee of the present application;

U.S. patent application Ser. No. 09/750,015 entitled "Apparatus and Method for Packet-Based Media Communications" filed on Dec. 29, 2000 and assigned to the assignee of the present application;

U.S. patent application Ser. No. 09/664,450 entitled "Apparatus and Method for Packet-Based Media Communications" filed on Sep. 18, 2000 and assigned to the assignee of the present application.

The contents of the above documents are herein incorporated by reference. The reader is also invited to refer to the following documents:

Forgie, J. W. and Feehrer, C. E. and Weene, P. L., "Voice Conferencing Technology Final Report", MIT Lincoln Lab, March 1979, No. DDC ADA074498, Lexington, Mass.

Forgie, James W., "Voice conferencing in packet networks", IEEE-ICC, pp. 21.3.1–21.3.4, June 1980, Seattle, Wash.

Champion, Terrence G., "Multi-speaker conferencing over narrowband channels", IEEE-MILCOM, pp. 1220–1223, November 1991, Washington, D.C.

U.S. Pat. Nos. 5,457,685; 5,383,184; 5,317,567; 5,272,698; all entitled "Multi speaker conferencing over narrowband channels" and issued to Champion, Terrence G.

U.S. Pat. No. 5,390,177, issued to Nahumi, Dror entitled "Conferencing arrangement for compressed information signals".

U.S. Pat. No. 5,436,896, issued to Anderson, Thomas W. et al., entitled "Conference bridge for packetized speech-signal networks".

U.S. Pat. No. 5,570,363, issued to Holm, Robert E., entitled "Transform based scalable audio compression algorithms and low cost audio multi-point conferencing systems".

The contents of the above documents are herein incorporated by reference.

Media signal sources generally support respective sets of encoding types allowing them to communicate with various other media signal sources. Specific examples of encoding types used to encode speech signals include ITU-T Recommendations G.729, G.726, G.723.1, G.722, G.722.1 and G.728 amongst others. Media signal sources are generally designed to be downward compatible and, as such, media signal sources implementing enhanced, and hence more complex, encoding functionality will usually also implement basic, and hence less complex, encoding functionality. Typically, in order to allow all the participants of a conference to communicate with one another, all the participants of the conference transmit media data packets to the conference bridge including media information encoded using an established common encoding type. This "common" encoding type is typically communicated to the media signal sources when the signal sources negotiate to be admitted to the conference. Therefore, the common encoding type is frequently the encoding type supported by the media signal source that provides the least complex encoding functionality in the conference.

A deficiency with current conference systems designed to reduce the occurrence of back-to-back (tandem) encode-decode operations is that they do not provide any suitable functionality for supporting multiple encoding types within a given conference. Take an example where there are 100 participants in a conference call associated with 100 respective media signal sources and where 99 media signal sources implement a basic encoding type and an enhanced encoding type and 1 media signal source implements the basic encoding type only. In this case, the common encoding type for the conference is set to the basic encoding type. Therefore, unless all media signal sources in the conference implement the enhanced encoding functionality, the enhanced encoding functionality provided by the media signal source is essentially rendered nearly useless by current conferencing systems.

Consequently, there is a need in the industry for providing a conference bridge media signal source and a conference system that at least in part alleviate the deficiencies associated with the prior art.

SUMMARY OF THE INVENTION

In accordance with a broad aspect, the invention provides a method for managing a conference between a plurality of media signal sources generating media data packets conveying encoded media information and encoding type information. A plurality of link messages for joining a conference are received, each link message being associated with a respective media signal source of the plurality of media signal sources. Each link message includes a data element from which can be derived at least one encoding type that the associated media signal source can support during decoding of encoded media information. The data elements in the plurality of link messages are processed to derive a first encoding type and a second encoding type different from the first encoding type. The first encoding type is supported by each media signal source of the plurality of media signal sources. The second encoding type is supported by at least two media signal sources from the plurality of media signal sources and unsupported by at least one of the media signal sources from the plurality of media signal sources. A link message reply signal is generated for transmission to each media signal source of the plurality of media signal sources. The link message reply signals for transmission to the at least two media signal sources supporting the second encoding type convey the first encoding type and the second encoding type. The link message reply signals for transmission to the media signal sources other than the at least two media signal sources convey at least the first encoding type. The link message reply signals are then transmitted to the plurality of media signal sources.

An advantage of the present invention is that it allows a first encoding type common to all media signal sources in a given conference and a second encoding type common to a subset of the media signal sources in the given conference to be established. Typically, the first encoding type will be a basic, and hence less complex, encoding type and the second encoding type will be an enhanced encoding type, and hence of a higher complexity than the first encoding type. All the media signal sources in the conference communicate with one another using the first encoding type and the subset of media signal sources communicate using the second encoding type.

Encoding type information may be transmitted in explicit form as a bit or part of link message, or in association with a media signal source identifier in combination with a reference memory unit at a conference bridge or implicitly conveyed by any other suitable way that can allow the encoding type to be conveyed.

In a specific example of implementation, a memory element suitable for storing a plurality of records is provided, each record being associated with a media signal source part of the conference, each record declaring at least one encoding type supported by the associated media signal source. In response to a link message from a media signal source for which no record is present in the memory element, a record declaring at least one encoding type that the media signal source associated with the link message supports is generated and stored in the memory element.

Continuing the specific example of implementation, the method includes receiving a link message from a new media signal source subsequent to the deriving of the first and second encoding types. The data elements from the plurality of the media signal sources and the new media signal source are processed to derive a new first encoding type and a new second encoding type different from the new first encoding type. The plurality of the media signal sources and the new media signal source form an augmented set of media signal sources. The new first encoding type is supported by each media signal source of the augmented set of media signal sources. The new second encoding type is supported by at least two media signal sources from the augmented set of media signal sources and unsupported by at least one of the media signal sources from the augmented set of media signal sources. A link message reply signal is generated for transmission to each media signal source of the augmented set of media signal sources. The link message reply signals for transmission to the at least two media signal sources from the augmented set of media signal sources supporting the new second encoding type convey the new first encoding type and the new second encoding type. The link message reply signals for transmission to the media signal sources from the augmented set of media signal sources other than the at least two media signals sources convey at least the new first encoding type. The link message reply signals are then transmitted to the media signal sources in the augmented set of media signal sources.

Advantageously, the above-described method allows updating the supported first and second encoding types when a new media signal source joins a conference. In other words, the specific example of implementation of the invention allows the first and second encoding types to be dynamically determined when new media signal sources are added to the conference.

Continuing the specific example of implementation, the method includes receiving an exit message for exiting a conference, the exit message being associated with a given media signal source. The exit message is received subsequent to the deriving of the first and second encoding types. The exit message is processed to identify in the memory element a record associated with the given media signal source. The record associated with the given media signal source is removed from the plurality of records in the memory element thereby forming a reduced group of records, the reduced group of records being associated with a reduced group of media signal sources. The reduced group of records in the memory element is processed to derive a new first encoding type and a new second encoding type different from the new first encoding type. The new first encoding type is supported by each media signal source in the reduced group of media signal sources. The new second encoding type is supported by at least two media signal sources from the reduced group of media signal sources and unsupported by at least one of the media signal sources from the reduced group of media signal sources. A link message reply signal is generated for transmission to each media signal source of the reduced group of media signal sources. The link message reply signals for transmission to the at least two media signal sources from the reduced group of media signal sources supporting the new second encoding type convey the new first encoding type and the new second encoding type. The link message reply signals for transmission to the media signal sources from the reduced group of media signal sources other than the at least two media signals sources convey at least the new first encoding type.

The link message reply signals are then transmitted to the media signal sources in the reduced group of media signal sources.

Advantageously, the above-described method allows updating the supported first and second encoding types when a media signal source part of a conference exits the conference. In other words, the specific example of implementation of the invention allows the first and second encoding types to be dynamically determined when media signal sources exit a given conference.

In accordance with a non-limiting example of implementation, a set of second encoding types is derived where each second encoding type is supported by an associated subset of media signal sources from the plurality of media signal sources that are part of the conference. Each subset of media signal sources includes at least two media signal sources and excludes at least one of the media signal sources from the plurality of media signal sources. The link message reply signals released to each subset of media signal sources convey the first encoding type and the second encoding type supported by the subset of media signal sources. The link message reply signals for transmission to the media signal sources other than the media signal sources in the subsets of media signal sources convey at least the first encoding type.

In accordance with a non-limiting example of implementation, a set of second encoding types is derived where at least two media signal sources from the plurality of media signal sources support each second encoding type in the set of second encoding types. The derived set of second encoding types is processed to select at least one second encoding type from the set on the basis of performance characteristics associated with the second encoding types in the set of second encoding types.

In accordance with the non-limiting example of implementation, a set of first encoding types supported by each media signal source of the plurality of media signal sources is derived. The set of first encoding types is then processed to select at least one encoding type on the basis of performance characteristics associated with the encoding types in the set of first encoding types.

Advantageously, the above-described method allows selecting an encoding type on the basis of a desirable performance characteristic. Such performance characteristic may include, but are not limited to, bandwidth use, speech/image quality, complexity and memory usage.

In accordance with a non-limiting example of implementation, a set of first encoding types supported by each media signal source of the plurality of media signal sources that are part of the conference is derived. The link message reply signals for transmission to the at least two media signal sources supporting the second encoding type convey the set of first encoding types and the second encoding type. The link message reply signals for transmission to the media signal sources other than the at least two media signals sources convey at least the set of first encoding types.

In accordance with another broad aspect, the invention further provides a conference bridge implementing the above-described method.

In accordance with another broad aspect, the invention provides a computer readable medium comprising a program element suitable for execution by a computing apparatus for implementing the above-described method.

In accordance with another broad aspect, the invention provides a method for managing a conference at a media signal source, the media signal source supporting a plurality of encoding types and being operative for generating media data packets conveying encoded media information and encoding type information. A link message indicative of a desire of joining a given conference is generated at the media signal source. The link message includes a data element from which can be derived the plurality of encoding types that the media signal source can support. The link message is then transmitted to a conference bridge. In response to the link message, a link message reply signal is received from the conference bridge, the link message reply signal conveying a set of selected encoding types, the set of selected encoding types including at least one encoding type. The link message reply signal is processed at the media signal source to render active a subset of encoding types in the plurality of encoding types supported by the media signal source on the basis of the set of selected encoding types conveyed by the link message reply signal. This has the effect of causing the media data packets generated by the media signal source to include encoded media information and encoding type information generated on the basis of the subset of encoding types selected from the set of selected encoding types conveyed by the link message reply signal.

In a specific implementation, each encoding type in the set of encoding type in the link message reply signal is supported by the media signal source.

Continuing the specific implementation, each encoding type in the set of selected encoding types in the link message reply signal includes a first encoding type supported by each media signal source that is part of the conference and a second encoding type supported by at least two media signal sources and unsupported by at least one media signal source. The link message reply signal is processed to render active at the media signal source at least the first encoding type in the set of selected encoding types, thereby causing the media data packets generated by the media signal source to include encoded media information encoded on the basis of the first encoding type.

Optionally, the link message reply signal is processed to also render active the second encoding type in the media signal source. This causes the media signal source to generate media data packets using the first encoding type and the second encoding type.

In a non-limiting implementation, the set of selected encoding types in the link message reply signal includes a plurality of first encoding types supported by each media signal source that is part of the conference. The link message reply signal is processed at the media signal source to render active at least one first encoding type of the plurality of first encoding types. This causes the media data packets conveying encoded media information and encoding type information generated at the media signal source to be encoded using the first encoding type.

Continuing the non-limiting implementation, the set of selected encoding types in the link message reply signal includes a plurality of second encoding type. Each second encoding type in the plurality of second encoding type is supported by at least two media signal sources that are part of the conference, and is unsupported by at least one media signal source that is part of the conference. The link message reply signal is processed at the media signal source to render active at least one second encoding type of the plurality of second encoding types.

In accordance with another broad aspect, the invention provides a media signal source implementing the above described method.

In accordance with another broad aspect, the invention provides a computer readable medium comprising a program element suitable for execution by a computing apparatus for implementing the above-described method.

In accordance with another broad aspect, the invention provides a media conferencing system comprising a plurality of media signal sources connected to a conference bridge through a data communication network. Each media signal source supports a plurality of encoding types and is operative for generating media data packets conveying encoded media information and encoding type information. Each media signal source generates a link message indicative of a desire of joining a given conference, the link message including a data element from which can be derived the plurality of encoding types that the associated media signal source can support. Each media signal source then transmits its generated link message to the conference bridge. The conference bridge receives the link messages from the plurality of media signal sources and derives on the basis of the link messages a first encoding type and a second encoding type different from the first encoding type. The first encoding type is supported by each media signal source in the plurality of media signal sources. The second encoding type is supported by at least two media signal sources from the plurality of media signal sources and unsupported by at least one of the media signal sources from the plurality of media signal sources. The conference bridge then generates a link message reply signal for transmission to each media signal source of the plurality of media signal sources. The link message reply signals for transmission to the at least two media signal sources supporting the second encoding type convey the first encoding type and the second encoding type. The link message reply signals for transmission to the media signal sources other than the at least two media signals sources conveying at least the first encoding type. The link message reply signals are then transmitted to the media signal sources. Each media signal source in the plurality of media signal sources receives a link message reply signal, the link message reply signal conveying a set of selected encoding types, the set of selected encoding types including at least one encoding type. The link message reply signal is processed by the media signal source to render active a subset of encoding types in the plurality of encoding types supported by the media signal source on the basis of the set of selected encoding types conveyed by the link message reply signal. This has the effect of causing media data packets conveying encoded media information and encoding type information generated at the media signal source to be generated using the subset of encoding types of the set of selected encoding types conveyed by the link message reply signal.

In accordance with another broad aspect, the invention provides a method for managing a conference between a plurality of media signal sources generating media data packets conveying encoded media information and encoding type information. A memory element suitable for storing a plurality of records is provided, each record in the memory unit being associated with a media signal source part of a conference and declaring at least one encoding type supported by the associated media signal source. Media data packets are received from the plurality media signal sources. Each media data packet includes a content portion indicative of encoded media information and an encoding type portion declaring at least one encoding type associated with the content portion of the media data packet. The received media data packets are processed at the conference bridge to select at least one active media signal source on the basis of the content portions of the media data packets. The media data packets associated with the active media signal sources are processed to select a subset of media signal sources within the conference where the subset of media signal sources supports the encoding type associated with the media data packets. For a given media data packet, the selected subset of media signal sources is derived from the plurality of records in the memory unit at least in part on the basis of the encoding type portion of the given media data packet. The media data packets associated with the active media signal sources are then released for transmission to the selected subsets of media signal sources.

In a non-limiting example, each media data packet includes information descriptor data elements describing characteristics of the media information from which the encoded media information in the media packet was derived. When the media information is a speech signal, the information descriptor data elements may include a wide variety of information namely signal level information, speech segment classification information, noise level, signal segment descriptors and signal power as well as any additional information that may be useful to the conference bridge in selecting an active media signal source. Preferably, the information descriptor data elements are normalized such as to allow different types of signals to be compared. In a non-limiting example, in order to derive the information descriptor data elements, the signals are first converted to a normalized signal such that the signals are based on the same spectral area. For example, if there are signals utilizing difference bandwidth, all signals are normalized such that they lie in the narrowest common bandwidth. After this the desired measurement are computed to derive the information descriptor data elements for the signals. The conference bridge, upon receipt of the media packets, performs the standard task of a conferencing bridge wherein it selects two or more active channels and transmits the media packet associated the active channel to the terminals. However, the processing is effected using the information descriptor data elements provided. Advantageously, this allows a reduction in the computational requirements of the conference bridge and a reduction in the back-to-back encoding/decoding of the media data packets.

In accordance with another broad aspect, the invention further provides a conference bridge implementing the above-described method.

In accordance with another broad aspect, the invention provides a computer readable medium comprising a program element suitable for execution by a computing apparatus for implementing the above-described method.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 8a is a graphical representation of a memory unit for storing a set of second encoding types in accordance with a non-limiting example of implementation of the invention;

FIG. 8b is a graphical representation of a memory unit for storing a set of first encoding types in accordance with a non-limiting example of implementation of the invention;

DETAILED DESCRIPTION

Conferencing System

Figure 1:
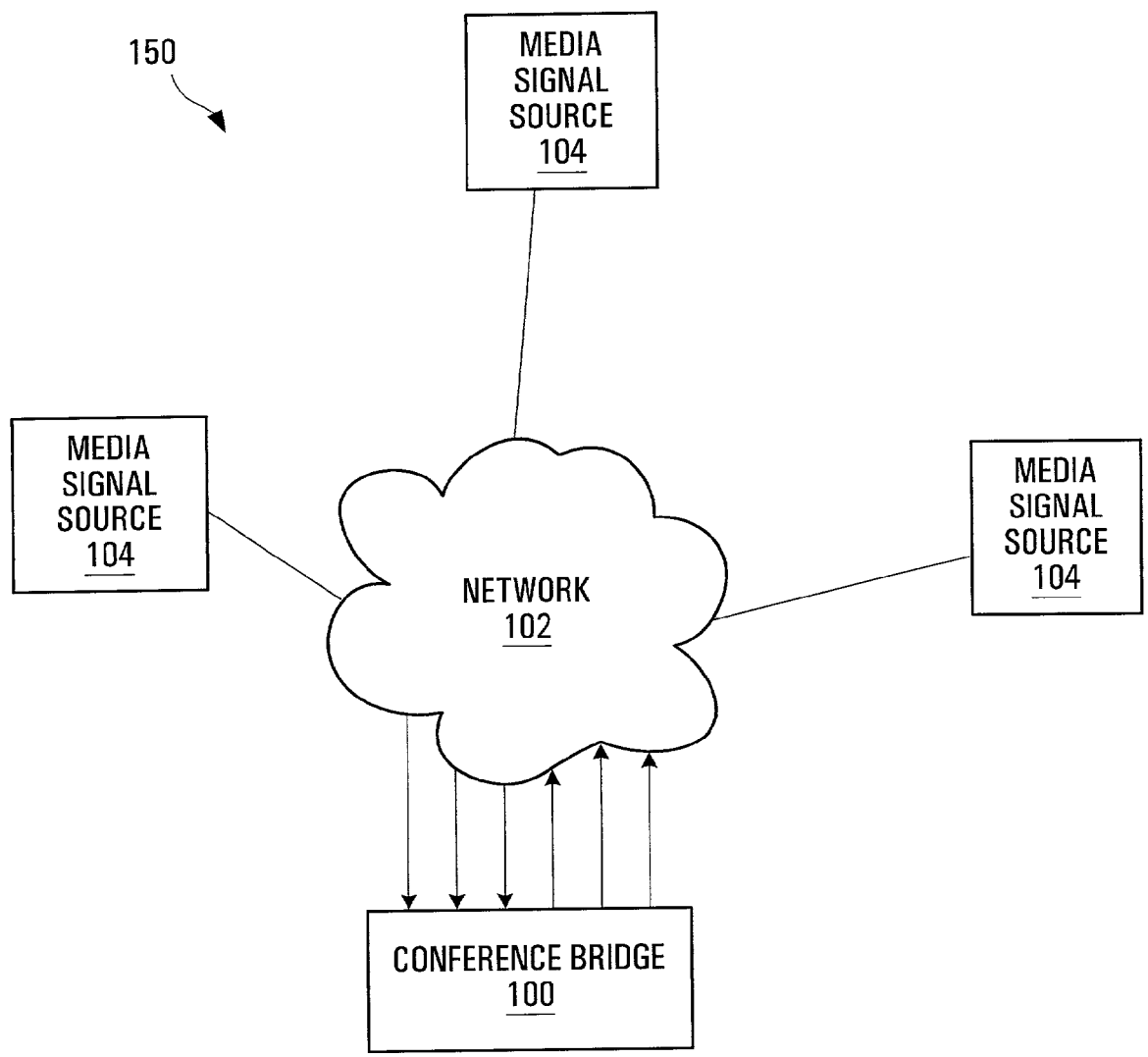
FIG. 1 is a block diagram of a media conferencing system in accordance with a specific example of implementation of the invention.

FIG. 1 of the drawings depicts a media conferencing system 150 providing media conferencing functionality. The media conferencing system 150 includes a plurality of media signal sources 104 connected to conference bridge 100 through network 102. Network 102 is a packet switched network that suitably carries packets between media signal sources 104 and conference bridge 100. The specific configuration of the networks 102 is not critical to the invention and any suitable network can be used to provide connectivity between the plurality of media signal sources 104 and the conference bridge 100. Such packet based networks are well known and, as such, need not be described further here. In operation, the media signal sources 104 exchange with the conference bridge 100 media packets including conference management activities and/or encoded media information through network 102. The conference bridge 100 accepts and releases media packets and processes them if necessary. These media packets can be related to conference management activities or can contain encoded media information for distribution to the media signal sources 104. In a negotiation stage, media signal sources 104 join a conference managed by the conference bridge 100 by negotiating with the conference bridge 100 the parameters of the conference. Amongst other parameters, the encoding types supported by the conference are derived by the conference bridge during this negotiation stage and are communicated to the media signal sources 104. Following this, during the data exchange stage, the media signal sources 104 exchange media data packets including encoded media information on the basis of the encoding types communicated by the conference bridge and supported by the conference. The manner in which the conference bridge 100 derives the encoding types supported during a given conference is described in greater detail herein below. In a practical non-limiting implementation, a minimum common encoding type for the conference may be established prior to the initiation of the conference, the minimum common encoding type being a requirement for joining the conference, such as to avoid the case where there is no common encoding type amongst the conference participants.

Media Signal Source 104

Media signal sources 104 are adapted to negotiate with the conference bridge 100 the parameters of a conference in order to be admitted as "participants" to the conference and to exchange media data packets with other conference participants.

Figure 2:
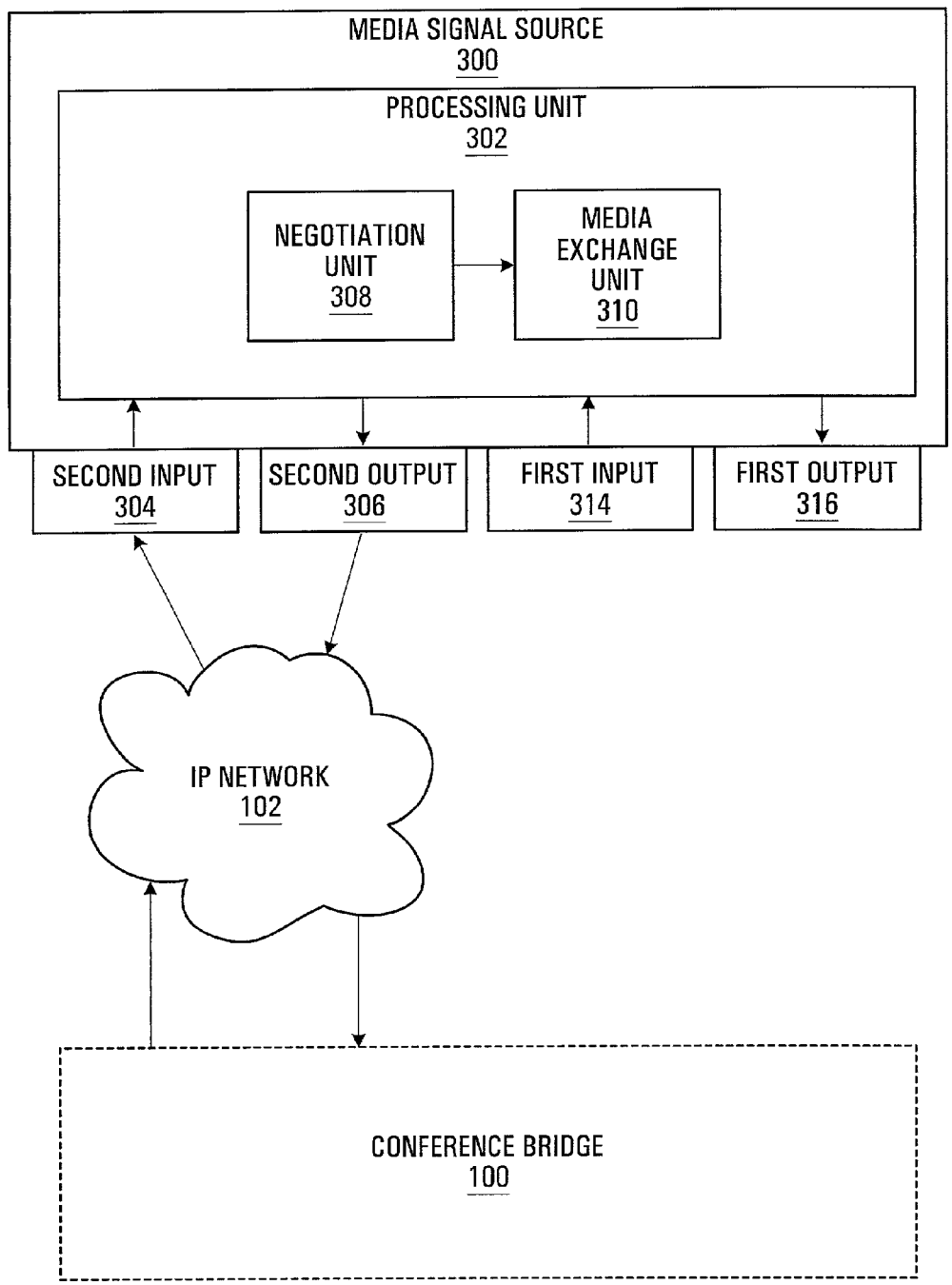
FIG. 2 is a block diagram of a media signal source suitable for use in the conference system of FIG. 1 in accordance with a specific example of implementation of the invention.

FIG. 2 shows in block diagram form a media signal source 300 comprising a processing unit 302 coupled to a first input 314, a first output 316, a second input 304, and a second output 306. The first input 314 and the first output 316 are used to respectively accept and release media information signals. Such signals may be in any suitable format and may be indicative of speech, video or any other media signal suitable for use in a conference. In a non-limiting example, a commonly used signal format for speech is PCM. The second input 304 and the second output 306 are used to respectively accept and release data packets comprising link messages, link message replies and media data packets including encoded media information. It will be readily apparent that although the first input 314 and the first output 316 are shown as separate components in the drawings, they may also be embodied in a same component, such as in an I/O port. Similarly, it will also be readily apparent that although FIG. 2 shows the second input 304 and the second output 306 as separate components in the drawings, they may also be embodied in a same component, such as in an I/O port.

In a non-limiting implementation, the processing unit 302 includes two functional units namely a negotiation unit 308 and a media exchange unit 310.

Media Exchange Unit 310

The media exchange unit 310 supports a respective set of encoding types for encoding media information received at the first input 314 and for decoding encoded media information received at the second input 304. The media exchange unit 310 receives from the first input 314 a media information signal and encodes the media information to produce encoded media information data elements. In accordance with a non-limiting implementation, the media exchange unit 310 includes a plurality of encoder units, each encoder unit supporting a respective encoding type. The media exchange unit 310 also includes a plurality of decoder units, each decoder unit supporting a respective encoding type for decoding. For the purpose of this specific example of implementation, the case where there is a one-to-one correspondence between the encoders and decoders will be described. It will be readily apparent that a one-to-one correspondence between the encoder units and the decoder units in the media exchange unit 310 is not necessary for the functioning of the invention. In a non-limiting implementation, each encoder unit can acquire one of two states namely an active state, in which it encodes media information signal, and an inactive state. The selection of the state of an encoder module is effected on the basis of a control signal issued by the negotiation unit 308. For each segment of the media information signal received at the first input 314, the media exchange unit 310 generates an encoded media information data element for each active encoder in the media exchange unit 310.

Figure 3A:
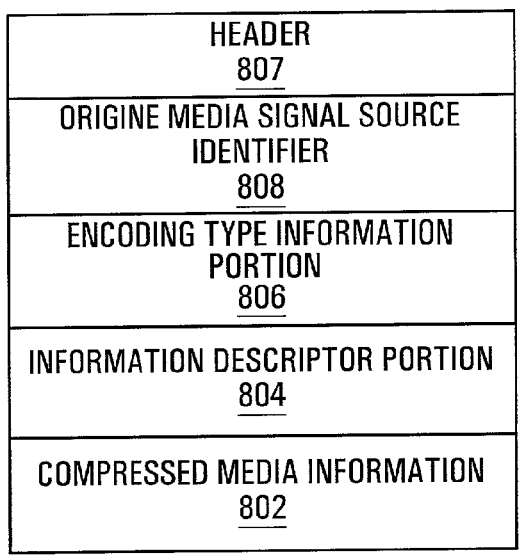
FIGS. 3a and 3b are graphical representations of media data packets suitable for use in the conference bridge of FIG. 4 in accordance with non-limiting examples of implementation of the invention.

In a first non-limiting example of implementation, for each generated encoded media information data element, the media exchange unit 310 encapsulates the media information data element into a respective media data packet. In other words, for each segment of the media information signal received at the first input 314, a set of media data packets is generated, each media data packet being associated with an encoded media information data element generated with a respective encoder. FIG. 3*a* shows in graphical form a media data packet 815 generated on the basis of the first non-limiting example. As shown, the packet 815 includes in a first section 802 encoded media information, in a second section 804 media information descriptor data elements, in a third section 806 encoding type information indicating the encoding type used to generate the encoded media information in the first section 802, in a fourth section 808 including an identifier associated with media signal source 300 and in a fifth section 807 other header information. It will be readily apparent that other elements may be included in the packet 815 without detracting from the spirit of the invention. In the case of speech media information, the media information descriptor data elements in the second section 804 may include signal level information, speech segment classification information, noise level, signal segment descriptors, signal power and any other data element characterising the media information from which the encoded media information in the first section 802 was derived.

Figure 3B:
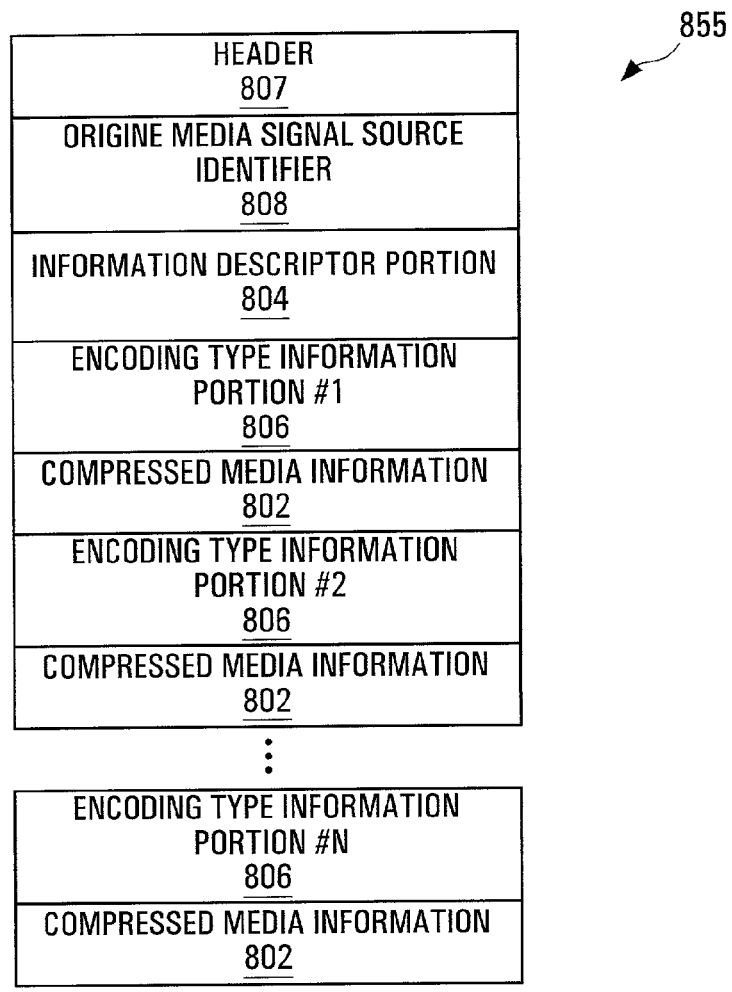

In a second non-limiting example of implementation, the media exchange unit 310 encapsulates the encoded media information data elements associated with a given segment of the media information signal into a same media data packet. In other words, for each segment of the media information signal received at the first input 314, a media data packet is generated, the media data packet including a set of encoded media information data elements, each encoded media information data elements being associated with a respective encoding type. FIG. 3*b* shows in graphical form a media data packet 855 generated on the basis of the second non-limiting example. As shown, the packet 855 includes a set of encoded media information data elements 802, each encoded media information data element being associated with a respective encoding type information data element 806, a media information descriptor data element, an identifier associated with media signal source 300 as well as header information 807.

The media exchange unit 310 transmits the generated media data packets to the conference bridge 100 via second output 306.

The media exchange unit 310 also receives at the second input 304 media data packets from the conference bridge.

In a first specific implementation, for each received packet of the type shown in FIG. 3*a*, the media exchange unit 310 extracts the encoding type information data element. If the media exchange unit 310 includes a decoder corresponding to the encoding type information data element, the media exchange unit 310 decodes the encoded media information data elements using the appropriate decoder to derive a segment of a media information signal. In a non-limiting example, the media exchange unit 310 is operative to determine whether a current media data packet includes encoded media information data elements derived from a same segment of a media information signal as a previously decoded media information data element in a previously received media data packet. This may be effected using any suitable method for identifying media data packets. For example, an ordering data element providing ordering information for a packet amongst a plurality of packets generated from a same media signal may be provided in the media data packet. A set of media data packets including encoded media information derived from a same media signal segment may be identified as such by being assigned a common ordering data element. The media exchange unit 310 identifies media data packets conveying the same media signal segment on the basis of the ordering data element. The media exchange unit 310 omits the decoding of the current media data packet if the media data packets has been identified as conveying the same media signal segment as a previously processed media data packet on the basis of the ordering data element.

In a second specific implementation, for each received media data packet of the type shown in FIG. 3*b*, the media exchange unit 310 extracts the set of encoding type information data elements. The media exchange unit 310 identifies a subset of encoding types in the set of encoding types data element in the media data packet which are supported for decoding at the media exchange unit 310. An encoding type is then selected from the subset of encoding types for use in decoding. The selection of the encoding type may be effected on the basis of a plurality of criteria, including without being limited to, the quality of the encoding type, the computational requirement associated with the decoding process and others. The encoded media information data element 802 corresponding to the selected encoding type is decoded using the appropriate decoder to derive a segment of a media information signal.

Advantageously, the second specific implementation of the media data packet (shown in FIG. 3*b*) requires a reduced amount of packet management activity from the bridge and from the media signal sources then the first specific implementation of the media data packet (shown in FIG. 3*a*). The second specific implementation of the media data packet (shown in FIG. 3*b*) may also reduce the complexity of managing the media data packets.

The media exchange unit 310 releases the decoded segment of a media information signal to the first output 316. The signal containing media information released at output 316 can then be processed by a speaker (for speech) to generate an audio output or by a display unit (video) to generate a video output, or transmitted for further processing.

As a non-limiting variant, the media exchange unit 310 further includes a transmission control unit for processing media data packets generated by the media exchange unit 310 to identify media data packets unlikely to be selected by the conference bridge for retransmission to the conference participants. The identification of the media data packets unlikely to be selected by the conference bridge may be effected on the basis of a plurality of criteria. In a non-limiting example, the media exchange unit 310 makes use of the media information descriptor data elements in the media data packets received at the second input 304 to identify media data packets unlikely to be selected by the conference bridge for retransmission to the conference participants. Any suitable heuristic test may be used to identify the media data packets. In a non-limiting example where the media signal is a speech signal, the signal level of the current data packet may be compared to a threshold established on the basis of the signal levels associated with the media data packets selected by the conference bridge and received at the second input 304. If the signal level associated with the current media data packet is below that threshold, the current media data packet is identified as unlikely to be selected by the conference bridge for retransmission to the conference participants. Other criteria and tests may be used without detracting from the spirit of the invention such as the speech segment classification information of the current media data packet, the noise level, the signal segment descriptors and signal power. The media exchange unit 310 then omits the transmission of the identified media data packets. Advantageously, by omitting the transmission of media data packets unlikely to be selected by the conference bridge, a reduction in the media data packet traffic over the network can be achieved thereby reducing bandwidth requirements for a given conference. It will be readily appreciated that the above described processing is effected on the basis of media data packets, the equivalent processing may be effected on the basis of the corresponding media signal segments without detracting from the spirit of the invention.

Negotiation Unit 308

The negotiation unit 308 negotiates with the conference bridge 100 the parameters of a conference in order for media signal source 300 to be admitted as a "participant" of the conference. More specifically, upon receiving an activation signal to join a given conference, the negotiation unit 308 generates a link message indicative of a desire of joining the given conference. The link message includes a data element from which can be derived the plurality of encoding types that the media exchange unit 310 can support.

Figure 4A:
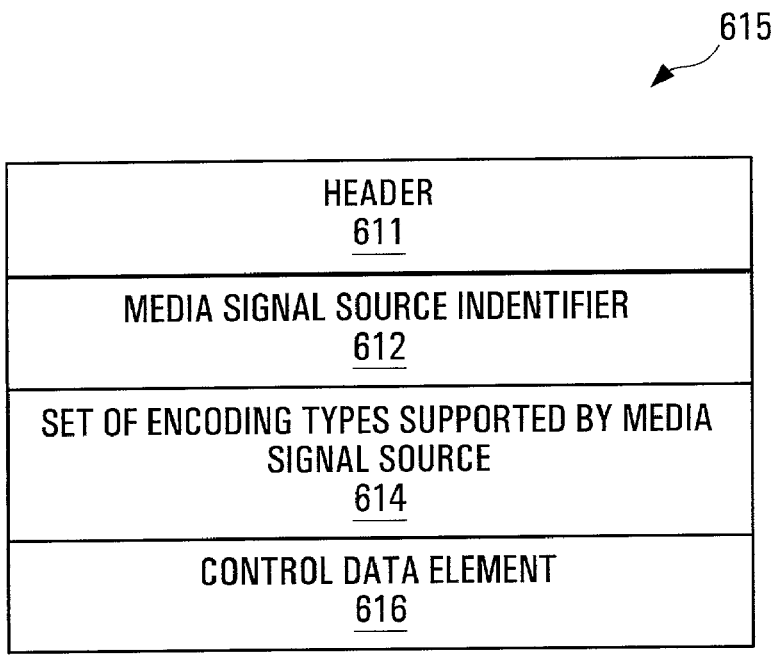
FIG. 4a is a graphical representation of a data structure including a link message suitable in accordance with a non-limiting example of implementation of the invention.

FIG. 4a shows, in graphical form, a non-limiting example of a packet 615 including a link message. As shown, the packet 615 includes in a first section header information 611 and an identifier 612 associated with media signal source 300, in a second section 614 a set of encoding types supported for decoding by decoder units in the media exchange unit 310 and in a third section 616 control data elements. It will be readily apparent that other elements may be included in the packet 615 without detracting from the spirit of the invention.

The link message is released at the second output 306 for transmission to the conference bridge 100.

In response to the link message, the media signal source 300 receives, at the second input 304, a link message reply signal from the conference bridge 100. The link message reply signal conveys a set of selected encoding types supported by the conference.

Figure 4B:
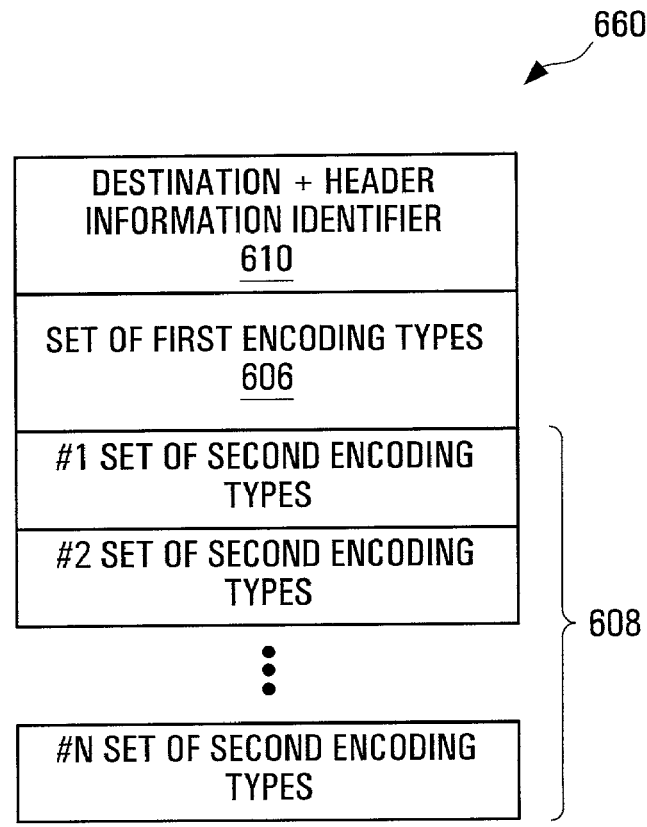
FIG. 4b is a graphical representation of a data structure including a link message reply suitable in accordance with a non-limiting example of implementation of the invention.

FIG. 4b shows in graphical form a non-limiting example of a packet 660 including a link message reply signal. As shown the packet 660 includes in a first section 610 an identifier associated with a destination media signal source as well as other header information, in a second section 606 a set of first encoding types supported by all the media signal sources in the conference, and in a third section 608 one or more sets of second encoding types supported by subsets of media signal sources in the conference. It will be readily apparent that the set of first encoding types may include one or more first encoding types and that each set of second encoding types may include one or more second encoding types supported by two or more media signal sources in the conference. It will be readily apparent that other elements may be included in the packet 660 without detracting from the spirit of the invention.

The negotiation unit 308 processes the link message reply signal to render active in the media exchange unit 310 at least some encoder units corresponding to the encoding types conveyed by the link message reply signal.

The negotiation unit 308 selects at least one first encoding type in the set of first encoding types supported by all the media signal sources in the conference and for which an encoder is provided by the media exchange unit 310. The selection of the first encoding type may be effected on the basis of a plurality of criteria, which may include without being limited to, the quality of the encoding type and/or the computational requirement associated with the encoding/decoding process amongst others. It is to be noted that the subset of encoding types received in the link message reply may also contain encoding types absent from the set of encoding types supported for encoding by the media exchange unit 310.

In a non-limiting example of implementation, the negotiation unit 308, in addition to selecting at least one first encoding type, selects at least one second encoding type supported by at least two media signal sources in the conference and for which an encoder is provided by the media exchange unit 310. The selection of the second encoding type may be effected on the basis of a plurality of criteria similar to those described with the regards to the selection of the first encoding type. Additional criteria such as computing power available at the media exchange unit 310, bandwidth available between the media signal source and the conference bridge 100 may be used in determining whether any second encoding types should be selected. For example, if bandwidth availability is low, the selection of the second encoding type may be omitted.

In yet another alternative embodiment, all the encoding types conveyed by the link message reply signal and for which encoders are provided by the media exchange unit 310 are selected by the negotiation unit 308.

Once the encoding types have been selected, the negotiation unit 308 issues a control signal to the media exchange unit 310 indicative of the selected encoding types thereby causing the encoders corresponding to the selected encoding types to be placed into the active state. In a non-limiting implementation, encoders implementing encoding types other than the selected encoding types are placed in the inactive state. This has the effect of causing the media exchange unit 310 to encode the media information signal received at the first input 314 on the basis of the active encoders.

In a non-limiting implementation, when the media signal source 300 exits the conference, the negotiation unit 308 generates and issues to the conference bridge 100 a packet including an exit messages in order for media signal source 300 to be removed as "participants" to the conference. The exit message includes an identifier associated with the media signal source 300 and a control data element indicating that the media signal source 300 associated with the identifier is exiting the conference.

Figure 5:
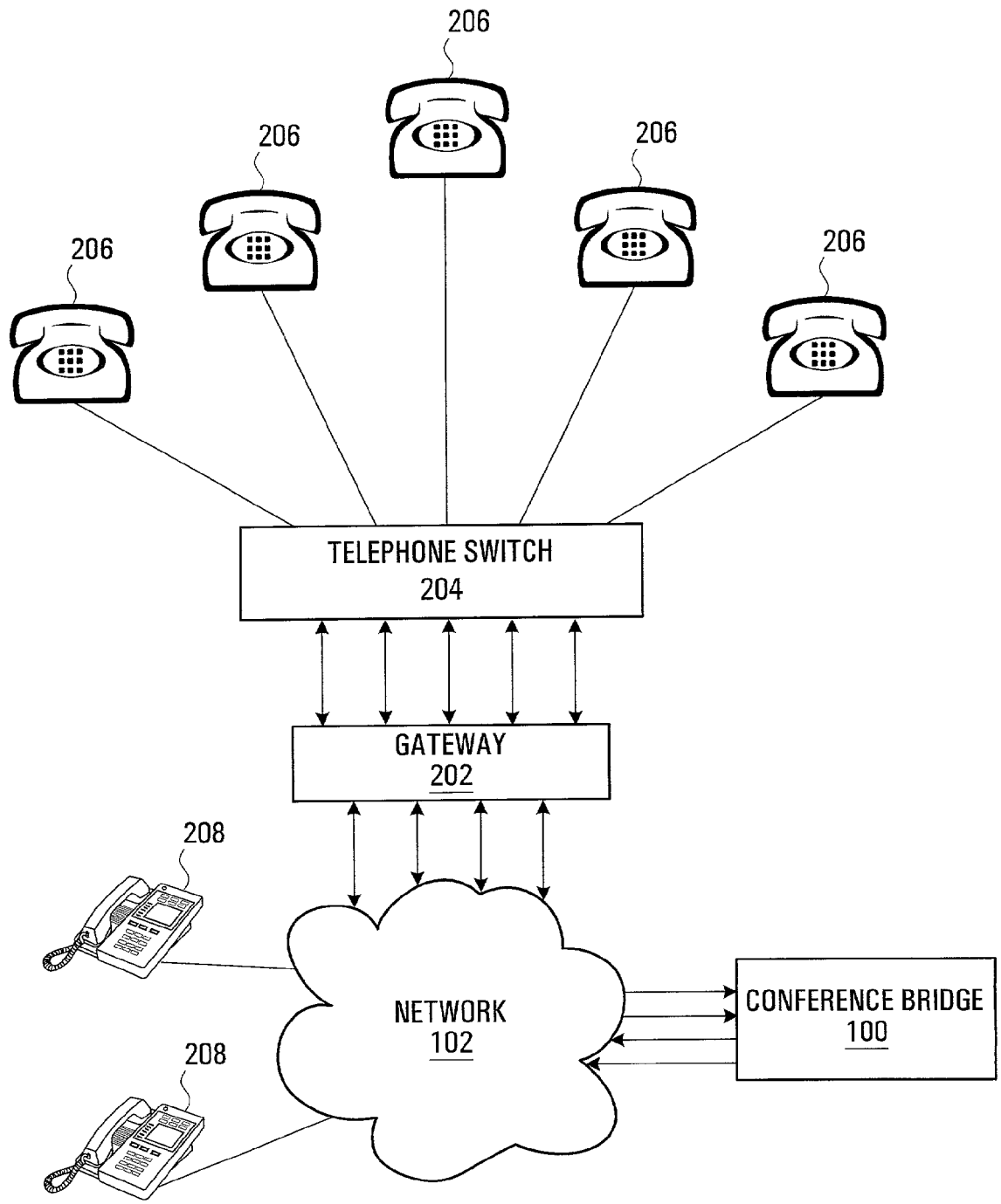
FIG. 5 is a block diagram of the media conferencing system of FIG. 1 depicting specific non-limiting examples of implementation of media signal sources.

In accordance with non-limiting example of implementations, as shown in FIG. 5, the media signal sources 104 may be suitably embodied as part of communications components such as, for example, a terminal unit 208 or a gateway 202.

In a first non-limiting example, the media signal source is embodied as part of a terminal unit 208. Typically, in addition to a media signal source, each terminal unit 208 includes an input interface and an output interface. The input interface, which may be in the form of a microphone or a video camera, accepts the media information signal to be transmitted in the form of data packets from the terminal unit 208 to the conference bridge 100. The output interface, which may be in the form of a speaker or a video monitor, processes the media information received at the terminal unit 208 to generate an audio or a video output.

In a second non-limiting example, the media signal source is embodied as part of gateway 202. The gateway 202 depicted in FIG. 5 is connected to network 102 and to a telephone switch 204. Gateway 202 has the capability to encode and decode voice data to and from data packets, to exchange data packets with network 102 and to exchange voice data, such as pulse code modulated (PCM) signals, with telephone switch 204. Telephone switch 204 also exchanges analog or digital voice signals with telephones 206. Gateway 202 is then used to interface telephone switch 204 with network 102.

Conference Bridge

The conference bridge 100 negotiates with the media signal sources 104 the parameters of a conference in order to admit media signal sources as "participants" to the conference. The conference bridge 100 also receives data packets incoming from media signal sources 104, and selects for retransmission to the media signal sources 104 at least some of the media data packets.

Figure 6:
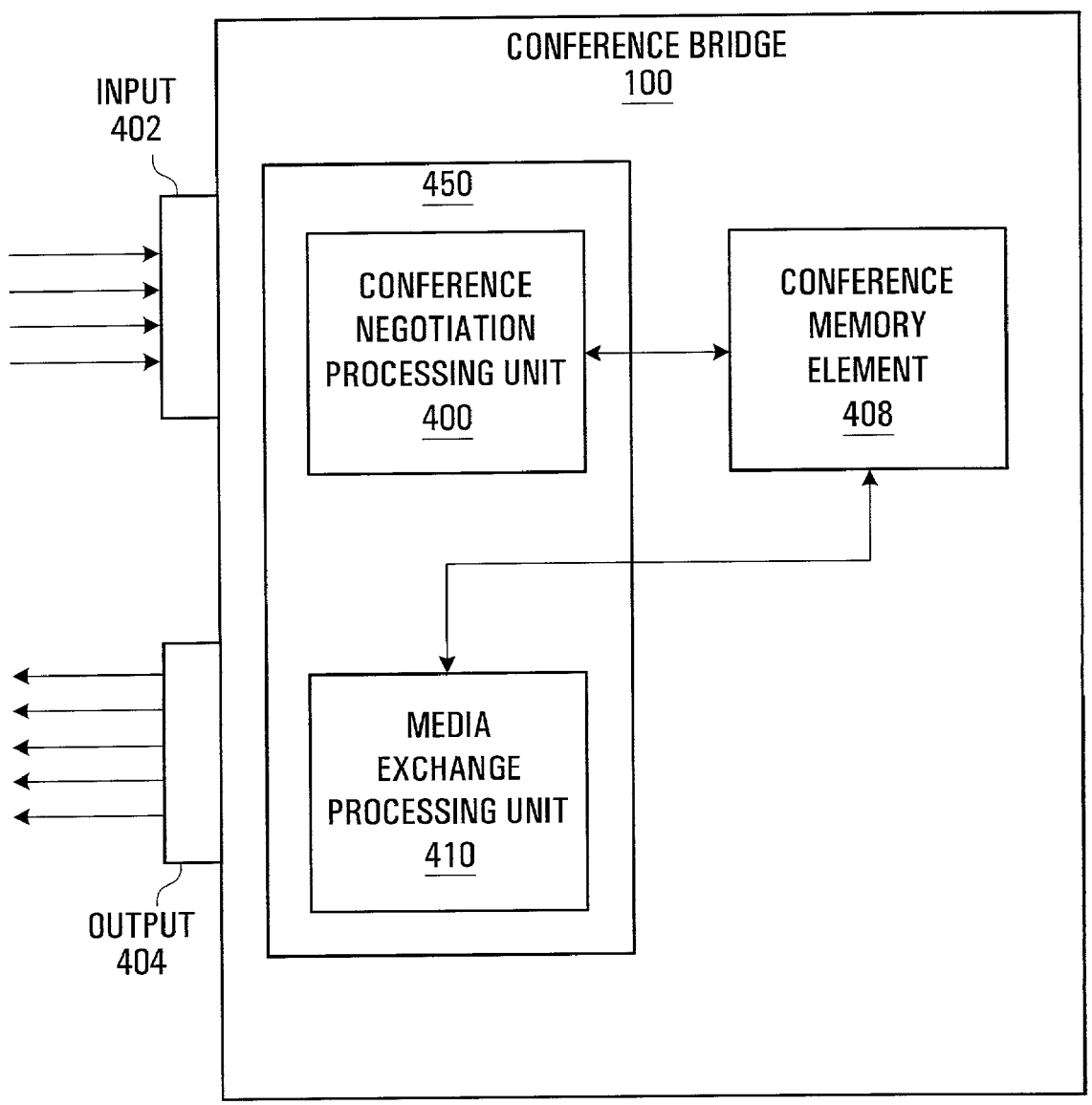
FIG. 6 is a block diagram of a conference bridge suitable for use in the media conferencing system of FIG. 1 in accordance with a non-limiting example of implementation of the invention.

FIG. 6 shows in block diagram form a conference bridge 100 comprising an input 402, an output 404, a processing unit 450 and a conference memory element 408. The input 402 and the output 404 are used to respectively accept and release data packets comprising link messages, exit messages, link message replies and media data packets. It will be readily apparent that although FIG. 4 shows the input 402 and the output 404 as separate components in the drawings, they may also be embodied in a same component, such as in an I/O port.

The conference memory element 408 stores a record for each media signal source 104 participating in the conference. Each record includes a media signal source identifier and a data element indicative of an encoding type supported by the media signal source corresponding to the record. Other entries useful to the management of a conference may be included in the conference memory element 408 without detracting from the spirit of the invention. The conference memory element 408 is updated by the conference processing unit 450 to reflect the current participants of the conference.

The processing unit 450 includes a conference negotiation processing unit 400 and a media exchange processing unit 402.

Negotiation Processing Unit 400

Link messages and exit messages received at input 402 are forwarded to the conference negotiation processing unit 400. The conference negotiation processing unit 400 processes the content of these link messages and exit messages and releases link message replies to output 404. The conference negotiation processing unit 400 is coupled to the conference memory element 408 for updating the records contained therein such that the conference memory element 408 includes the current participants of the conference. In a non-limiting implementation, for each link message and each exit message received, the conference negotiation processing unit 400 identifies a set of first encoding types supported by all the media signal sources participating in the conference.

A set of second encoding types supported by at least two, but not all, media signal sources participating in the conference is also identified. Appropriate link message replies are then issued. The manner in which the negotiation processing unit 400 generates the link message replies and updates the conference memory element 408 is described in greater detail herein below.

Figure 7:
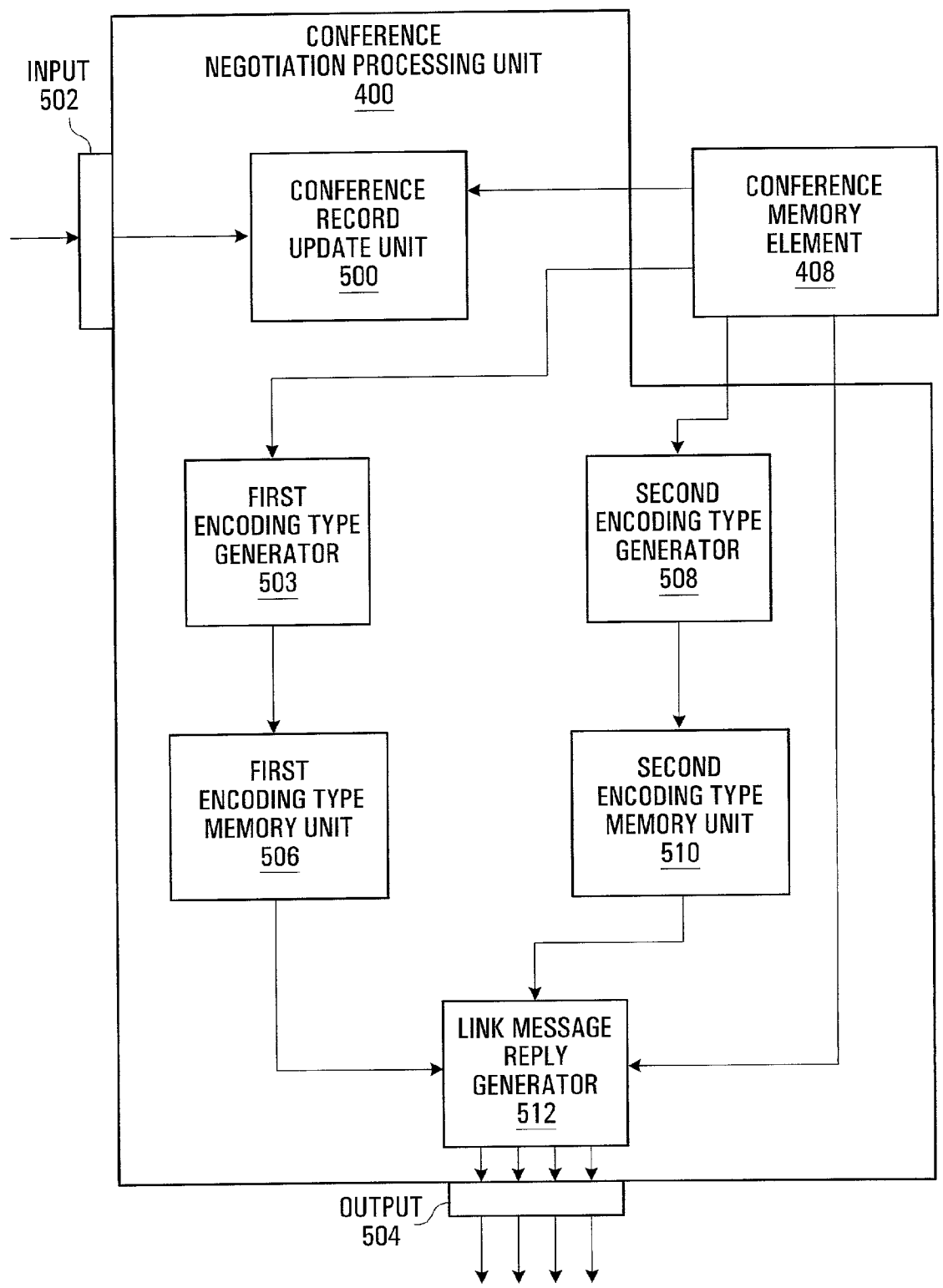
FIG. 7 is a block diagram of a conference negotiation processing unit suitable for use in the conference bridge of FIG. 6 in accordance with a non-limiting example of implementation of the invention.

In accordance with a non-limiting example of implementation and with reference to FIG. 7, the conference negotiation unit 400 includes an input 502, an output 504, a conference record update unit 500, a first encoding type generator 503, a second encoding type generator 508, a first encoding type memory unit 506, a second encoding type memory unit 510 and a link message reply generator 512. The input 502 is operatively coupled to the conference bridge input 402 and the output 504 is operatively coupled to the conference bridge output 404.

The conference record update unit 500 receives packets comprising link messages or exit messages.

Link messages originate from media signal sources 104 (shown in FIG. 1) joining a conference or from media signal sources changing their operational parameters. The conference record update unit 500 processes a link message to generate a record associated with the media signal source, the record including the one or more encoding types conveyed by the link message and an identifier associated with the media signal source. Other entries useful to the management of a conference may be included in the record without detracting from the spirit of the invention. The conference record update unit 500 then processes a link message to determine whether a record corresponding to the media signal source from which the link message originated exists in the conference memory element 504. If no record exists, as is the case for a media signal source joining the conference, the generated record is then stored in the conference memory element 408. If a record exists in the conference memory unit 408, in the case where a media signal source changes its operational parameter, the conference record update unit 500 replaces the existing record with the newly generated record. The records previously present in the conference memory unit 408 and the newly generated record form an augmented set of records.

An exit message typically originates from a media signal source part of a conference in order to be removed as a participant of the conference. The conference record update unit 500 processes an exit message to identify in the conference memory element 504 a record corresponding to the media signal source from which the exit message originated. If no record exists, as is the case for a media signal source which is not a current participant of the conference, the conference record update unit 500 performs some error type processing such as for example discarding the exit message. If a record exists in the conference memory unit 408, the conference record update unit 500 removes, or otherwise renders inactive, the identified record from the conference memory element 408. The records remaining in the conference memory unit 408 form a reduced set of records.

Once a link message or an exit message has been processed by the conference record update unit 500 and the conference memory element 408 has been updated, the conference record update unit 500 issues control signals to the first and second encoding type generators 503 and 508. These control signals initiate the processing of the records contained in the conference memory element 408.

The first encoding type generator 503 processes the records contained in the conference memory element 408 to generate a list of first encoding types supported by all the media signal sources 104 participating in the conference. This list of first encoding types is stored in the first encoding type memory unit 506. In a non-limiting example, with reference to FIG. 8B, encoding type identifiers are stored in a data structure 602, each encoding type identifier identifying a respective encoding type.

The second encoding type generator 508 processes the records contained in the conference memory element 408 to generate a list of encoding types supported by at least two, but not by all, of the media signal sources 104 participating in the conference. Identifying encoding types supported by subsets of media signal source may be effected by any suitable method. This list of encoding types supported by at least two, but not by all, of the media signal sources 104 is stored in the second encoding type memory unit 510. In a non-limiting example, with reference to FIG. 8A, encoding type identifiers are stored in a data structure 600 including a plurality of records, each record including a first entry and a second entry. The first entry is indicative of an encoding type and the second entry is indicative of a set of media signal source identifiers corresponding to the media signal sources supporting the encoding type identified on the same record. In a non-limiting implementation, the data structure 600 stored in the decreasing order of the number of media signal sources supporting the encoding types.

The link message reply generator 512 processes the information present in the first and second encoding type memory unit 506 and 510 to generate link message replies. The format and information content of the link message replies was described above with reference to FIG. 4b. The link message reply signals for transmission to the media signal sources supporting the first encoding types convey at least one of the first encoding types.

Many possible implementations regarding the generation of the content of link message replies are possible.

In a specific example of implementation, the link message reply issued to each media signal source 104 participating in the conference contains encoding types supported by the receiving media signal source.

In another specific example of implementation, all link message replies issued are identical and contain all or a part of the information contained in the first and second encoding type memory units 560 and 510. In a non-limiting implementation, subsets of encoding types comprised in the first and second encoding type memory units 506 and 510 are selected by the link message reply generator 512, with only the selected subsets of encoding types being included in the link message replies. The subsets choice can be made according to performance characteristics of the encoding types, network bandwidth available, memory usage, complexity and quality or any other criteria providing an advantage in the selection of the particular subsets. It is to be noted that at least one encoding type should be selected from the set of first encoding types in memory unit 506 in order to provide interoperability between all the media signal sources in the conference.

Many possible implementations regarding the issuance of link message replies are possible.

In a non-limiting example, for each link message and each exit message processed by the conference record update unit 500, a link message reply is generated for each media signal source that is part of the conference. The list of media signal sources part of the conference may be obtained from the conference memory element 408.

In an alternative non-limiting example, link message replies may be issued to only the media signal source having newly joined the conference when the first encoding types and second encoding types contained in the first and second encoding type memory units 506 and 510 are not modified by the media signal source joining or exiting the conference.

When modifications to the first and second encoding type memory units 506 and 510 occur, then a link message reply is generated for each media signal source that is part of the conference. Alternatively, when modifications to the first and second encoding type memory units 506 and 510 occur due to a link message or an exit message, a link message reply is generated and issued to the media signal sources which are affected by the changes.

The link message reply signals are then released at the output 504 for transmission to the media signal sources 104 in the conference.

Media Exchange Processing Unit 410

Media data packets received at input 402 are forwarded to the media exchange processing unit 410. The media exchange processing unit 410 accepts and releases media data packets respectively through input 402 and output 404. Typically, the exchange processing unit 410 receives media data packets from input 402, the media data packets originating from media signals sources part of the conference. The exchange processing unit 410 processes the media data packets to select a first set of media signal sources to be considered active. The exchange processing unit 410 then transmits to the participants of the conference the media data packets originating from the identified active media signal sources. This process is described in further detail herein below.

Figure 9:
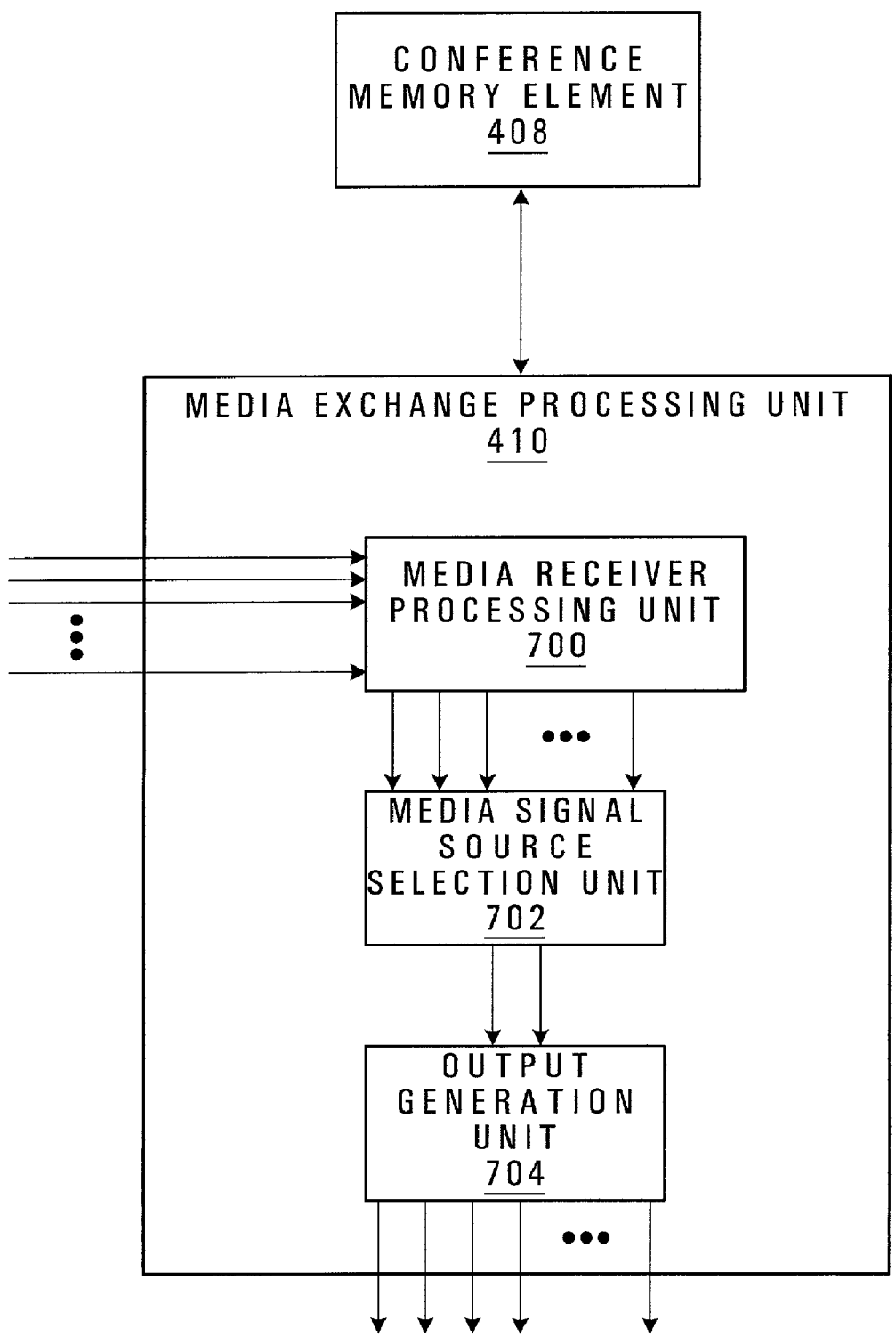
FIG. 9 is a block diagram of a media exchange processing unit suitable for use in the conference bridge of FIG. 6 in accordance with a non-limiting example of implementation of the invention.

With reference to FIG. 9, in accordance with a non-limiting example of implementation, the media exchange processing unit 410 includes a media receiver processing unit 700, a media signal source selection unit 702 and an output generation unit 704. The media receiver processing unit 700 is operatively coupled to the conference bridge input 402 and the output generation unit 704 is operatively coupled to the conference bridge output 404.

Incoming media data packets, the information content and structure of which were described herein above with reference to FIGS. 3A and 3B of the drawings, are accepted by the media receiver processing unit 700. For each media signal data packet, the media receiver processing unit 700 forwards the media data packets to the media signal source selection unit 702 for processing. The media receiver processing unit 700 may also perform other functions such as for example packet receipt ordering, jitter processing and other processing.

The media signal source selection unit 702 uses information contained in the media data packets to select a set of media signal sources to be considered active. As mentioned previously, the media data packets contain an information descriptor portion 804. The content of this information descriptor portion is used to select a set of media signal sources to be considered active. The determination of active media signal sources may be done using any suitable method. For specific examples of these methods, the reader is invited to refer to:

U.S. Pat. No. 4,031,328, issued to Pitroda, Satyan G., entitled "Conferencing arrangement for use in a {PCM} system".

U.S. Pat. No. 4,387,457, issued to Munter, Ernst A., entitled "Digital conference circuit and method".

U.S. Pat. No. 4,499,578, issued to Marouf et al., entitled "Method and apparatus for controlling signal level in a digital conference arrangement".

U.S. Pat. No. 4,658,398, issued to Hsing, To R., entitled "Framed digital voice summing for teleconferencing".

U.S. Pat. No. 5,390,177, issued to Nahumi, Dror, entitled "Conferencing arrangement for compressed information signals".

U.S. Pat. No. 5,436,896, issued to Anderson, Thomas W. et al., entitled "Conference bridge for packetized speech-signal networks".

U.S. Pat. No. 5,570,363, issued to Holm, Robert E., entitled "Transform based scalable audio compression algorithms and low cost audio multi-point conferencing systems".

Canadian Patent Application 2,224,541, entitled "Method of providing conferencing in telephony".

The contents of the above documents are hereby incorporated by reference. The reader is also invited to refer to the following co-pending patent applications:

U.S. patent application Ser. No. 09/475,047 entitled "Apparatus and Method for Packet-Based Media Communications" filed on Dec. 30, 1999 and assigned to the assignee of the present application;

U.S. patent application Ser. No. 09/750,015 entitled "Apparatus and Method for Packet-Based Media Communications" filed on Dec. 29, 2000 and assigned to the assignee of the present application;

U.S. patent application Ser. No. 09/664,450 entitled "Apparatus and Method for Packet-Based Media Communications" filed on Sep. 18, 2000 and assigned to the assignee of the present application.

The contents of the above documents are hereby incorporated by reference. It is to be noted that the information used to effect the media data packet choice is preferably entirely contained in the information descriptor portion 804. Advantageously, this allows selecting the active media signal sources in a conference without requiring decoding and/or encoding of the media information thereby reducing computational requirements at the bridge and reducing degradation of the media information due to multiple encoding and decoding.

The output generation unit 704 accepts the selected media data packets associated with the active media signal sources and directs them to the media signal sources in the conference through the network 102(shown in FIG. 1).

In a first non-limiting implementation, a given data packet associated with an active media signal source is sent to all the media signal sources 104 in the conference, with the exception of the media signal source having generated the given data packet. This is most useful when the media signal sources 104 excludes playback of media data encoded using an encoding type unsupported by the media signal source.

Alternatively, in a second non-limiting implementation, a given data packet associated with an active media signal source may be sent to a subset of media signal sources in the conference, the subset excluding the media signal source having generated the given data packet and media signal sources which do not support the encoding type(s) associated with the media data packet. In this non-limiting example, output generation unit 704 makes use of the encoding type portion associated with the given media data packet and the plurality of records in the memory element. The given data packets is sent to each media signal source in the subset of media signal sources supporting an encoding type declared in the encoding type portion of the given media data packet with the exception of the media signal source having generated the given data packet.

A Typical Interaction

A typical interaction will better illustrate the functioning of the negotiation processing unit 400 of the conference bridge.

Figure 10:
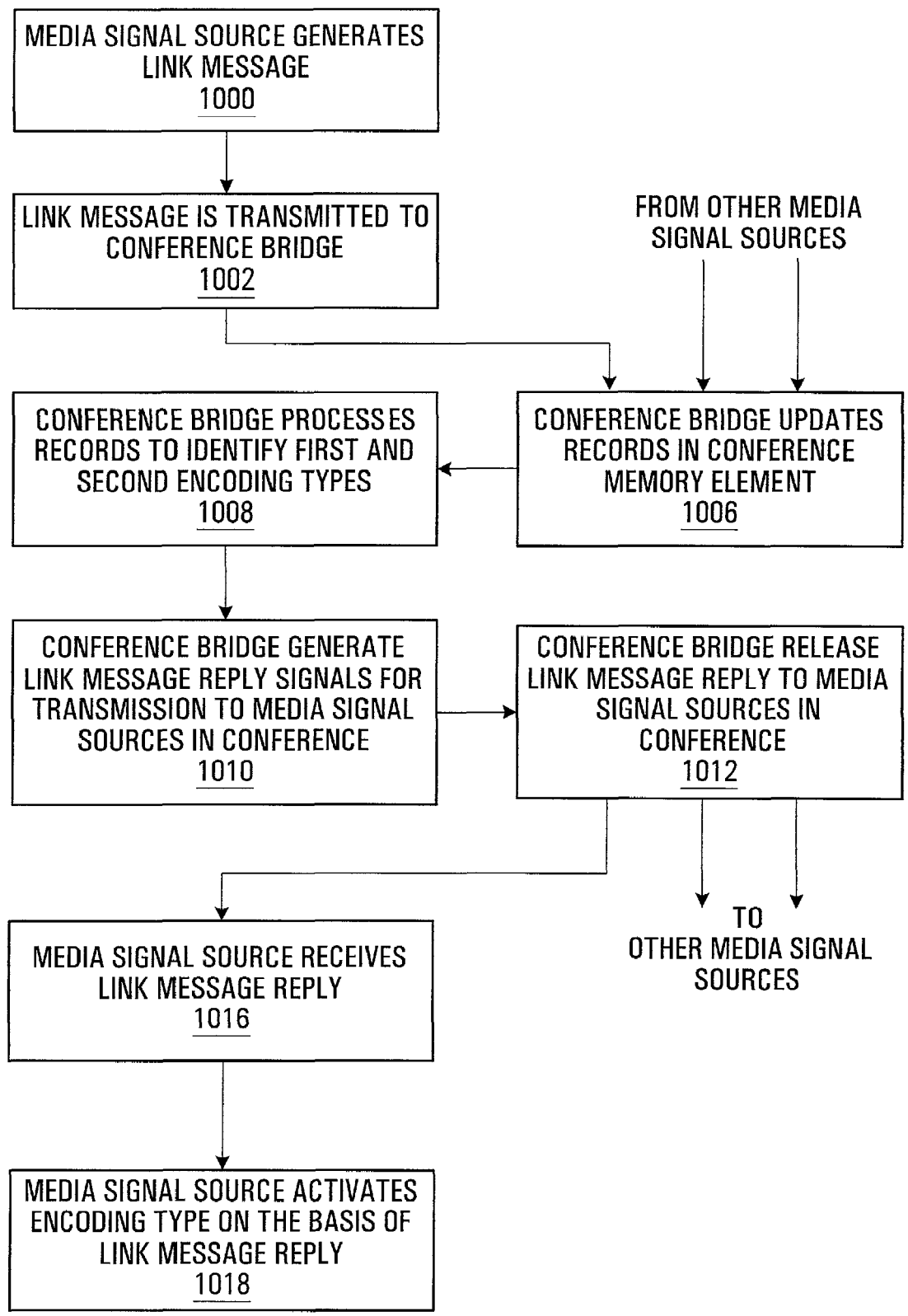
FIG. 10 is a flow diagram of a process for managing the negotiation stage of a conference when new conference participants join the conference in accordance with a specific example of implementation of the invention.

With reference to FIG. 10, at step 1000, the negotiation unit 308 in a media signal source 104 generates a link message indicating that the media signal source 104 wishes to become a participant of the conference. At step 1002, the generated link message is transmitted to the conference bridge 100 through the network 102. At the conference bridge 100, packets conveying link messages are received and forwarded to the negotiation processing unit 400. At step 1006, the conference negotiation processing unit 400 updates the records in conference memory element 404 on the basis of link messages received from a plurality of media signal sources 104. At step 1008, the conference negotiation processing unit 400 processes the records in memory element 404 to identify a set of first encoding types and a set of second encoding types. Subsequently, at steps 1010 the conference negotiation processing unit 400 generates suitable link message reply messages and at step 1012, the link reply messages are transmitted through network 102 to the media signal sources 104 participating in the conference. At step 1016, each media signal source receives the link message reply. At step 1018, each media signal source, in response to a respective link message reply, activates one or more encoders associated with the encoding types conveyed by its respective link reply message. In a non-limiting implementation, the negotiation process implemented by the negotiation processing unit 400 described above is performed each time a new link message is received and a new participant is added to the conference.

Figure 11:
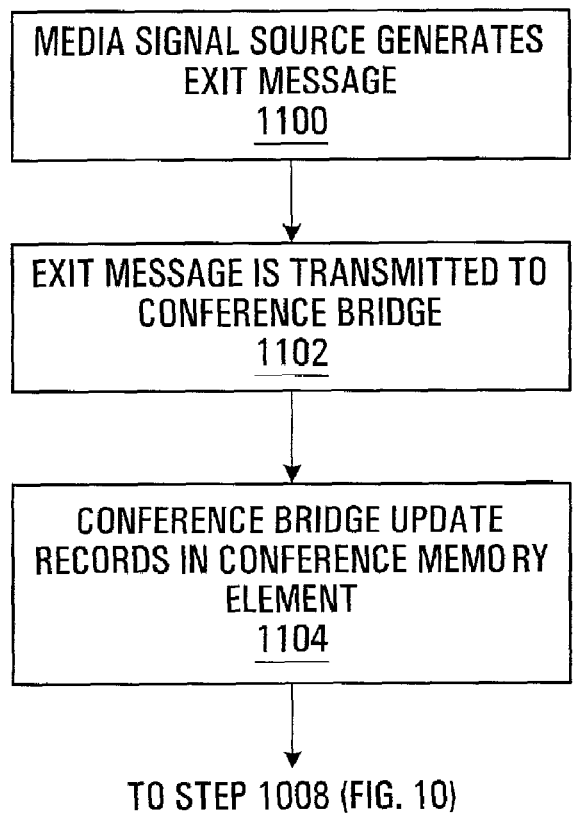
FIG. 11 is a flow diagram of a process for managing the negotiation stage of a conference when a conference participant exits the conference in accordance with a specific example of implementation of the invention.

With reference to FIG. 11, a typical non-limiting interaction will better illustrate the functioning of the negotiation processing unit 400 when a conference participant exits a given conference. At step 1100, a media signal source generates, using its negotiation unit 308, an exit message indicating that the media signal source is exiting the conference. At step 1102, the exit message is transmitted, through the network 102 to the conference bridge 100. On the basis of the exit message, at step 1104, the conference negotiation processing unit 400 at the conference bridge then updates the records in the conference memory element 404 to remove, or otherwise render inactive, the record associated with the media signal source from which the exit message originated. Following this, the process continues at step 1008 shown in FIG. 10.

Specific Implementation

Figure 12:
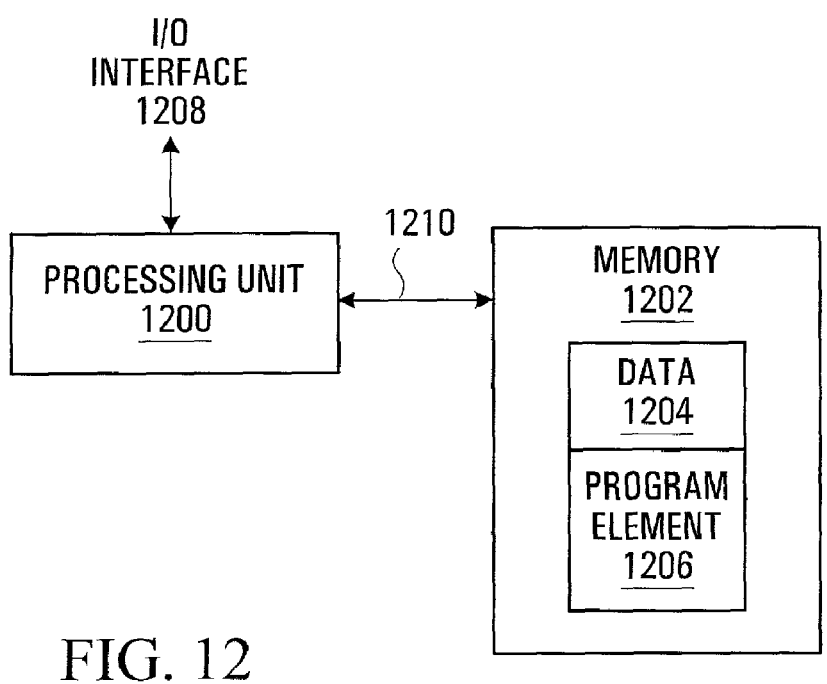
FIG. 12 is a block diagram of an apparatus for implementing either one of the conference bridge of FIG. 6 and the media signal source of FIG. 2 in accordance with non-limiting examples of implementation of the invention.

The components involved in the above-described conference bridge 100 and media signal sources 104 can be implemented on any suitable computing platform as shown in FIG. 12. Such a computing platform typically includes a processing unit 1200 and a memory or computer readable medium 1202 connected to the processing unit 1200 by a data communication bus 1210. The memory 1202 stores the data 1204 and the instructions of the program element 1206 implementing the functional blocks depicted in the drawings and described in the specification and depicted in the drawings. The computing platform may also comprise an I/O 1208 interface for receiving or sending data elements to external devices.

Alternatively, the above-described system can be implemented on a dedicated hardware platform where electrical/optical components implement the functional blocks described in the specification and depicted in the drawings.

Specific implementations may be realized using ICs, ASICs, DSPs, FPGA or other suitable hardware platform. It will be readily appreciated that the hardware platform is not a limiting component of the invention.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. A conference bridge suitable for managing a conference between a plurality of media signal sources generating media data packets conveying encoded media information and encoding type information, said conference bridge comprising:
   a) an input for receiving a plurality of link messages for joining a conference, each link message being associated with a respective media signal source of the plurality of media signal sources, each link message including a data element from which can be derived at least one encoding type that the associated media signal source can support during decoding of encoded media information;
   b) a processing unit coupled to said input, said processing unit being operative for:
      i. processing the data elements in the plurality of link messages to derive:
         (a) a first encoding type supported by each media signal source of the plurality of media signal sources;
         (b) a second encoding type different from the first encoding type supported by at least two media signal sources from the plurality of media signal sources and unsupported by at least one of the media signal sources from the plurality of media signal sources;
      ii. generating a link message reply signal for transmission to each media signal source of the plurality of media signal sources, the link message reply signals for transmission to the at least two media signal sources supporting the second encoding type conveying the first encoding type and the second encoding type, the link message reply signals for transmission to the media signal sources other than the at least two media signals sources conveying at least the first encoding type;
   c) an output coupled to said processing unit for releasing the link message reply signals for transmission to the plurality of media signal sources.

2. A conference bridge as described in claim 1, wherein said processing unit includes a memory element, said memory element suitable for storing a plurality of records, each record being associated with a media signal source part of the conference, each record declaring at least one encoding type supported by the associated media signal source.

3. A conference bridge as defined in claim 2, wherein said processing unit is responsive to a link message from a media signal source for which no record is present in said memory element to generate a record in said memory element declaring at least one encoding type that the media signal source associated with the link message supports.

4. A conference bridge as described in claim 1, wherein said processing unit is responsive to a link message received from a new media signal source subsequent to the deriving of the first and second encoding types for:
   a) processing the data elements from the plurality of the media signal sources and the new media signal source to derive:
      i. a new first encoding type supported by each media signal source of the plurality of the media signal sources and the new media signal source, the plurality of the media signal sources and the new media signal source forming an augmented set of media signal sources;
      ii. a new second encoding type different from the new first encoding type supported by at least two media signal sources from the augmented set of media signal sources and unsupported by at least one of the media signal sources from the augmented set of media signal sources;
   b) generating a link message reply signal for transmission to each media signal source of the augmented set of media signal sources, the link message reply signals for transmission to the at least two media signal sources from the augmented set of media signal sources supporting the new second encoding type conveying the new first encoding type and the new second encoding type, the link message reply signals for transmission to the media signal sources from the augmented set of media signal sources other than the at least two media signals sources conveying at least the new first encoding type.

5. A conference bridge as described in claim 2, wherein said input is further operative for receiving an exit message for exiting a conference, the exit message being associated with a given media signal source, said processing unit being responsive to an exit message received from a media signal source subsequent to the deriving of the first and second encoding types for:
   i. processing the exit message to identify in said memory element a record associated with said given media signal source;
   ii. removing the record associated with said given media signal source identified in i. from the plurality of records in said memory element thereby forming a reduced group of records, the reduced group of records being associated with a reduced group of media signal sources;
   iii. processing the reduced group of records to derive:
      (a) a new first encoding type supported by each media signal source of the reduced group of media signal sources;
      (b) a new second encoding type different from the first encoding type supported by at least two media signal sources from the reduced group of media signal sources and unsupported by at least one of the media signal sources from the reduced group of media signal sources;
   iv. generating a link message reply signal for transmission to each media signal source of the reduced group of media signal sources, the link message reply signals for transmission to the at least two media signal sources from the reduced group of media signal sources supporting the new second encoding type conveying the new first encoding type and the new second encoding type, the link message reply signals for transmission to the media signal sources from the reduced group of media signal sources other than the at least two media signals sources conveying at least the new first encoding type.

6. A conference bridge as described in claim 1, wherein said processing unit is operative for:

a) deriving a set of second encoding types, each second encoding type in said set of encoding types being supported by an associated subset of media signal sources, each subset of media signal sources including at least two media signal sources from the plurality of media signal sources and excluding at least one of the media signal sources from the plurality of media signal sources; and b) generating a link message reply signal for transmission to each media signal source of the plurality of media signal sources, the link message reply signals released to each subset of media signal sources conveying the first encoding type and the second encoding type associated with the subset of media signal sources, the link message reply signals for transmission to the media signal sources other than the media signal sources in the subsets of media signal sources conveying at least the first encoding type.

7. A conference bridge as described in claim 1, wherein said processing unit is operative for:

a) deriving a set of second encoding types supported by at least two media signal sources from the plurality of media signal sources and unsupported by at least one of the media signal sources from the plurality of media signal sources;

b) processing the set of second encoding types derived in a) to select at least one second encoding type on the basis of performance characteristics associated with the second encoding types in the set of second encoding types;

c) generating a link message reply signal for transmission to each media signal source of the plurality of media signal sources, the link message reply signals for transmission to the at least two media signal sources supporting the second encoding type selected in b) conveying the first encoding type and the second encoding type selected in b), the link message reply signals for transmission to the media signal sources other than the at least two media signals sources conveying at least the first encoding type.

8. A conference bridge as described in claim 1, wherein said processing unit is operative for:

a) deriving a set of first encoding types supported by each media signal source of the plurality of media signal sources;

b) generating a link message reply signal for transmission to each media signal source of the plurality of media signal sources, the link message reply signals for transmission to the at least two media signal sources supporting the second encoding type conveying the set of first encoding types and the second encoding type, the link message reply signals for transmission to the media signal sources other than the at least two media signals sources conveying at least the set of first encoding types.

9. A conference bridge as described in claim 1, wherein said processing unit is operative for:

a) deriving a set of first encoding types supported by each media signal source of the plurality of media signal sources;

b) processing the set of first encoding types derived in a) to select at least one encoding type on the basis of performance characteristics associated with the encoding types in the set of first encoding types;

c) generating a link message reply signal for transmission to each media signal source of the plurality of media signal sources, the link message reply signals for transmission to the at least two media signal sources supporting the second encoding type conveying the at least one first encoding type selected in b) and the second encoding type, the link message reply signals for transmission to the media signal sources other than the at least two media signals sources conveying the at least one first encoding type selected in b).

10. A method suitable for managing a conference between a plurality of media signal sources generating media data packets conveying encoded media information and encoding type information, said method comprising:

a) receiving a plurality of link messages for joining a conference, each link message being associated with a respective media signal source of the plurality of media signal sources, each link message including a data element from which can be derived at least one encoding type that the associated media signal source can support during decoding of encoded media information;

b) processing the data elements in the plurality of link messages to derive:
 i. a first encoding type supported by each media signal source of the plurality of media signal sources;
 ii. a second encoding type different from the first encoding type supported by at least two media signal sources from the plurality of media signal sources and unsupported by at least one of the media signal sources from the plurality of media signal sources;

c) generating a link message reply signal for transmission to each media signal source of the plurality of media signal sources, the link message reply signals for transmission to the at least two media signal sources supporting the second encoding type conveying the first encoding type and the second encoding type, the link message reply signals for transmission to the media signal sources other than the at least two media signals sources conveying at least the first encoding type;

d) releasing the link message reply signals for transmission to the plurality of media signal sources.

11. A method as described in claim 10, wherein said method further comprises providing a memory element suitable for storing a plurality of records, each record being associated with a media signal source part of the conference, each record declaring at least one encoding type supported by the associated media signal source.

12. A method as defined in claim 11, wherein said method comprises:

a) generating a record in response to a link message from a media signal source for which no record is present in said memory element, the record declaring at least one encoding type that the media signal source associated with the link message supports;

b) storing the record in said memory element.

13. A method as described in claim 10, wherein said method comprises:

a) receiving a link message from a new media signal source subsequent to the deriving of the first and second encoding types;

b) processing the data elements from the plurality of the media signal sources and the new media signal source to derive:
 i. a new first encoding type supported by each media signal source of the plurality of the media signal sources and the new media signal source, the plurality of the media signal sources and the new media signal source forming an augmented set of media signal sources;

ii. a new second encoding type different from the new first encoding type supported by at least two media signal sources from the augmented set of media signal sources and unsupported by at least one of the media signal sources from the augmented set of media signal sources;

c) generating a link message reply signal for transmission to each media signal source of the augmented set of media signal sources, the link message reply signals for transmission to the at least two media signal sources from the augmented set of media signal sources supporting the new second encoding type conveying the new first encoding type and the new second encoding type, the link message reply signals for transmission to the media signal sources from the augmented set of media signal sources other than the at least two media signals sources conveying at least the new first encoding type;

d) releasing the link message reply signals for transmission to the media signal sources in the augmented set of media signal sources.

14. A method as described in claim 11, wherein said method further comprises:

a) receiving an exit message for exiting a conference, the exit message being associated with a given media signal source, said exit message being received subsequent to the deriving of the first and second encoding types;

b) processing the exit message to identify in the memory element a record associated with the given media signal source;

c) removing the record associated with the given media signal source identified in b) from the plurality of records in the memory element thereby forming a reduced group of records, the reduced group of records being associated with a reduced group of media signal sources;

d) processing the reduced group of records in the memory element to derive:
  i. a new first encoding type supported by each media signal source of the reduced group of media signal sources;
  ii. a new second encoding type different from the first new encoding type supported by at least two media signal sources from the reduced group of media signal sources and unsupported by at least one of the media signal sources from the reduced group of media signal sources;

e) generating a link message reply signal for transmission to each media signal source of the reduced group of media signal sources, the link message reply signals for transmission to the at least two media signal sources from the reduced group of media signal sources supporting the new second encoding type conveying the new first encoding type and the new second encoding type, the link message reply signals for transmission to the media signal sources from the reduced group of media signal sources other than the at least two media signals sources conveying at least the new first encoding type;

f) releasing the link message reply signals for transmission to the media signal sources in the reduced group of media signal sources.

15. A method as described in claim 10, wherein said method further comprises:

a) deriving a set of second encoding types, each second encoding type in said set of encoding types being supported by an associated subset of media signal sources, each subset of media signal sources including at least two media signal sources from the plurality of media signal sources and excluding at least one of the media signal sources from the plurality of media signal sources; and b) generating a link message reply signal for transmission to each media signal source of the plurality of media signal sources, the link message reply signals released to each subset of media signal sources conveying the first encoding type and the second encoding type supported by the subset of media signal sources, the link message reply signals for transmission to the media signal sources other than the media signal sources in the subsets of media signal sources conveying at least the first encoding type.

16. A method as described in claim 10, wherein said method comprises:

a) deriving a set of second encoding types supported by at least two media signal sources from the plurality of media signal sources and unsupported by at least one of the media signal sources from the plurality of media signal sources;

b) processing the set of second encoding types derived in a) to select at least one second encoding type on the basis of performance characteristics associated with the second encoding types in the set of second encoding types;

c) generating a link message reply signal for transmission to each media signal source of the plurality of media signal sources, the link message reply signals for transmission to the at least two media signal sources supporting the second encoding type selected in b) conveying the first encoding type and the second encoding type selected in b), the link message reply signals for transmission to the media signal sources other than the at least two media signals sources conveying at least the first encoding type.

17. A method as described in claim 10, wherein said method comprises:

a) deriving a set of first encoding types supported by each media signal source of the plurality of media signal sources;

b) generating a link message reply signal for transmission to each media signal source of the plurality of media signal sources, the link message reply signals for transmission to the at least two media signal sources supporting the second encoding type conveying the set of first encoding types and the second encoding type, the link message reply signals for transmission to the media signal sources other than the at least two media signals sources conveying at least the set of first encoding types.

18. A method as described in claim 10, wherein said method comprises:

a) deriving a set of first encoding types supported by each media signal source of the plurality of media signal sources;

b) processing the set of first encoding types derived in a) to select at least one encoding type on the basis of performance characteristics associated with the encoding types in the set of first encoding types;

c) generating a link message reply signal for transmission to each media signal source of the plurality of media signal sources, the link message reply signals for transmission to the at least two media signal sources supporting the second encoding type conveying the at least one first encoding type selected in b) and the second encoding type, the link message reply signals for transmission to the media signal sources other than the at least two media signals sources conveying the at least one first encoding type selected in b).

19. A computer readable medium including a program element suitable for execution by a computing apparatus for managing a conference between a plurality of media signal sources generating media data packets conveying encoded media information and encoding type information, said computing apparatus comprising:
 a) a memory;
 b) a processor operatively connected to said memory unit, said program element when executing on said processor being operative for:
  i. receiving a plurality of link messages for joining a conference, each link message being associated with a respective media signal source of the plurality of media signal sources, each link message including a data element from which can be derived at least one encoding type that the associated media signal source can support during decoding of encoded media information;
  ii. processing the data elements in the plurality of link messages to derive:
   (a) a first encoding type supported by each media signal source of the plurality of media signal sources;
   (b) a second encoding type different from the first encoding type supported by at least two media signal sources from the plurality of media signal sources and unsupported by at least one of the media signal sources from the plurality of media signal sources;
  iii. generating a link message reply signal for transmission to each media signal source of the plurality of media signal sources, the link message reply signals for transmission to the at least two media signal sources supporting the second encoding type conveying the first encoding type and the second encoding type, the link message reply signals for transmission to the media signal sources other than the at least two media signals sources conveying at least the first encoding type;
  iv. releasing the link message reply signals for transmission to the plurality of media signal sources.

20. A computer readable storage medium as described in claim 19, wherein said memory element is suitable for storing a plurality of records, each record being associated with a media signal source that is part of the conference, each record declaring at least one encoding type supported by the associated media signal source.

21. A computer readable storage medium as defined in claim 10, wherein said program element when executing on said processor is operative for:
 a) generating a record in response to a link message from a media signal source for which no record is present in said memory, the record declaring at least one encoding type that the media signal source associated with the link message supports;
 b) storing the record in said memory.

22. A computer readable storage medium as described in claim 19, wherein said program element when executing on said processor is operative for:
 a) receiving a link message from a new media signal source subsequent to the deriving of the first and second encoding types;
 b) processing the data elements from the plurality of the media signal sources and the new media signal source to derive:
  i. a new first encoding type supported by each media signal source of the plurality of the media signal sources and the new media signal source, the plurality of the media signal sources and the new media signal source forming an augmented set of media signal sources;
  ii. a new second encoding type different from the new first encoding type supported by at least two media signal sources from the augmented set of media signal sources and unsupported by at least one of the media signal sources from the augmented set of media signal sources;
 c) generating a link message reply signal for transmission to each media signal source of the augmented set of media signal sources, the link message reply signals for transmission to the at least two media signal sources from the augmented set of media signal sources supporting the new second encoding type conveying the new first encoding type and the new second encoding type, the link message reply signals for transmission to the media signal sources from the augmented set of media signal sources other than the at least two media signals sources conveying at least the new first encoding type;
 d) releasing the link message reply signals for transmission to the media signal sources in the augmented set of media signal sources.

23. A computer readable storage medium as described in claim 20, wherein said program element when executing on said processor is operative for:
 a) receiving an exit message for exiting a conference, the exit message being associated with a given media signal source, said exit message being received subsequent to the deriving of the first and second encoding types;
 b) processing the exit message to identify in the memory element a record associated with the given media signal source;
 c) removing the record associated with the given media signal source identified in b) from the plurality of records in the memory element thereby forming a reduced group of records, the reduced group of records being associated with a reduced group of media signal sources;
 d) processing the reduced group of records in the memory element to derive:
  i. a new first encoding type supported by each media signal source of the reduced group of media signal sources;
  ii. a new second encoding type different from the new first encoding type supported by at least two media signal sources from the reduced group of media signal sources and unsupported by at least one of the media signal sources from the reduced group of media signal sources;
 e) generating a link message reply signal for transmission to each media signal source of the reduced group of media signal sources, the link message reply signals for transmission to the at least two media signal sources from the reduced group of media signal sources supporting the new second encoding type conveying the new first encoding type and the new second encoding type, the link message reply signals for transmission to the media signal sources from the reduced group of media signal sources other than the at least two media signals sources conveying at least the new first encoding type;

f) releasing the link message reply signals for transmission to the media signal sources in the reduced group of media signal sources.

24. A computer readable storage medium as described in claim 19, wherein said program element when executing on said processor is operative for:
   a) deriving a set of second encoding types, each second encoding type in said set of encoding types being supported by an associated subset of media signal sources, each subset of media signal sources including at least two media signal sources from the plurality of media signal sources and excluding at least one of the media signal sources from the plurality of media signal sources; and
   b) generating a link message reply signal for transmission to each media signal source of the plurality of media signal sources, the link message reply signals released to each subset of media signal sources conveying the first encoding type and the second encoding type supported by the subset of media signal sources, the link message reply signals for transmission to the media signal sources other than the media signal sources in the subsets of media signal sources conveying at least the first encoding type.

25. A computer readable storage medium as described in claim 19, wherein said program element when executing on said processor is operative for:
   a) deriving a set of second encoding types supported by at least two media signal sources from the plurality of media signal sources and unsupported by at least one of the media signal sources from the plurality of media signal sources;
   b) processing the set of second encoding types derived in a) to select at least one second encoding type on the basis of performance characteristics associated with the second encoding types in the set of second encoding types;
   c) generating a link message reply signal for transmission to each media signal source of the plurality of media signal sources, the link message reply signals for transmission to the at least two media signal sources supporting the second encoding type selected in b) conveying the first encoding type and the second encoding type selected in b), the link message reply signals for transmission to the media signal sources other than the at least two media signals sources conveying at least the first encoding type.

26. A computer readable storage medium as described in claim 19, wherein said program element when executing on said processor is operative for:
   a) deriving a set of first encoding types supported by each media signal source of the plurality of media signal sources;
   b) generating a link message reply signal for transmission to each media signal source of the plurality of media signal sources, the link message reply signals for transmission to the at least two media signal sources supporting the second encoding type conveying the set of first encoding types and the second encoding type, the link message reply signals for transmission to the media signal sources other than the at least two media signals sources conveying at least the set of first encoding types.

27. A computer readable storage medium as described in claim 19, wherein said program element when executing on said processor is operative for:
   a) deriving a set of first encoding types supported by each media signal source of the plurality of media signal sources;
   b) processing the set of first encoding types derived in a) to select at least one encoding type on the basis of performance characteristics associated with the encoding types in the set of first encoding types;
   c) generating a link message reply signal for transmission to each media signal source of the plurality of media signal sources, the link message reply signals for transmission to the at least two media signal sources supporting the second encoding type conveying the at least one first encoding type selected in b) and the second encoding type, the link message reply signals for transmission to the media signal sources other than the at least two media signals sources conveying the at least one first encoding type selected in b).

28. A media signal source suitable for generating media data packets conveying encoded media information and encoding type information, said media signal source supporting a plurality of encoding types, said media signal source including:
   a) a processing unit operative for generating a link message indicative of a desire of joining a given conference, the link message including a data element from which can be derived the plurality of encoding types that said media signal source can support;
   b) an output unit suitable for releasing the link message for transmission to a conference bridge;
   c) an input suitable for receiving a link message reply signal from the conference bridge, the link message reply signal conveying a set of selected encoding types, the set of selected encoding types including at least one encoding type;
   d) said processing unit being operative for processing the link message reply signal to render active a subset of encoding types in the plurality of encoding types supported by said media signal source on the basis of the set of selected encoding types conveyed by the link message reply signal, thereby causing media data packets generated by the media signal source to include encoded media information encoded using at least one encoding type of the subset of encoding types.

29. A media signal source as defined in claim 28, wherein each encoding type in the set of encoding type in said link message reply signal is supported by said media signal source.

30. A media signal source as defined in claim 29, wherein the set of selected encoding types in said link message reply signal includes:
   a) a first encoding type supported by each media signal source that is part of the conference;
   b) a second encoding type supported by at least two media signal sources that are part of the conference, said second encoding type being unsupported by at least one media signal source that is part of the conference;
   c) the processing unit being operative for processing the link message reply signal to render active at least the first encoding type in the set of selected encoding types, thereby causing media data packets generated by the media signal source to include encoded media information encoded on the basis of at least the first encoding type.

31. A media signal source as defined in claim 30, wherein said processing unit is operative for processing the link message reply signal to render active the second encoding type in said media signal source, thereby causing media data packets generated by the media signal source to include encoded media information and encoding type information derived using said first encoding type and encoded media information and encoding type information derived using said second encoding type.

32. A media signal source as described in claim 28, wherein the media signal source is part of a terminal unit.

33. A media signal source as described in claim 28, wherein the media signal source is part of a gateway.

34. A method for managing a conference at a media signal source, the media signal source being operative for generating media data packets conveying encoded media information and encoding type information, the media signal source supporting a plurality of encoding types, said method comprising:
 a) generating a link message indicative of a desire of joining a given conference, the link message including a data element from which can be derived the plurality of encoding types that said media signal source can support;
 b) releasing the link message for transmission to a conference bridge;
 c) receiving a link message reply signal from the conference bridge, the link message reply signal conveying a set of selected encoding types, the set of selected encoding types including at least one encoding type;
 d) processing the link message reply signal to render active a subset of encoding types in the plurality of encoding types supported by the media signal source on the basis of the set of selected encoding types conveyed by the link message reply signal, thereby causing the media signal source to generate media data packets conveying encoded media information and encoding type information using the subset of encoding types of said set of selected encoding types conveyed by the link message reply signal.

35. A method as defined in claim 34, wherein each encoding type in the set of encoding type in the link message reply signal is supported by the media signal source.

36. A media signal source as defined in claim 34, wherein the set of selected encoding types in the link message reply signal includes:
 a) a first encoding type supported by each media signal source that is part of the conference;
 b) a second encoding type supported by at least two media source part of the conference, said second encoding type being unsupported by at least another media signal source that is part of the conference;
 c) said method comprising processing the link message reply signal to render active at least the first encoding type in the set of selected encoding types, thereby causing the media signal source to generate media data packets conveying encoded media information and encoding type information using at least said first encoding type.

37. A method as defined in claim 36, said method comprising processing the link message reply signal to render active the second encoding type in said media signal source, thereby causing said media signal source to generate media data packets conveying encoded media information and encoding type information using said first encoding type and said second encoding type.

38. A media conferencing system comprising:
 a) a plurality of media signal sources, each media signal source being suitable for generating media data packets conveying encoded media information and encoding type information, each media signal source supporting a respective set of encoding types, said media signal source including:
  i. a processing unit operative for generating a link message indicative of a desire of joining a given conference, the link message including a data element from which can be derived the plurality of encoding types that said media signal source can support;
  ii. an output unit suitable for releasing the link message for transmission to a conference bridge;
  iii. an input suitable for receiving a link message reply signal from a conference bridge, the link message reply signal conveying a set of selected encoding types, the set of selected encoding types including at least one encoding type;
  iv. said processing unit being operative for processing the link message reply signal to render active a subset of encoding types in the plurality of encoding types supported by said media signal source on the basis of the set of selected encoding types conveyed by the link message reply signal, thereby causing said media signal source to generate media data packets conveying encoded media information and encoding type information using the subset of encoding types of said set of selected encoding types conveyed by the link message reply signal;
 b) a conference bridge suitable for interconnecting said plurality of media signal sources, said conference bridge comprising:
  i. an input for receiving a plurality of link messages for joining a conference, each link message being associated with a respective media signal source of the plurality of media signal sources, each link message including a data element from which can be derived at least one encoding type that the associated media signal source can support during decoding of encoded media information;
  ii. a processing unit coupled to said input, said processing unit being operative for:
   (a) processing the data elements in the plurality of link messages to derive:
    (i) a first encoding type supported by each media signal source of the plurality of media signal sources;
    (ii) a second encoding type different from the first encoding type supported by at least two media signal sources from the plurality of media signal sources and unsupported by at least one of the media signal sources from the plurality of media signal sources;
   (b) generating a link message reply signal for transmission to each media signal source of the plurality of media signal sources, the link message reply signals for transmission to the at least two media signal sources supporting the second encoding type conveying the first encoding type and the second encoding type, the link message reply signals for transmission to the media signal sources other than the at least two media signals sources conveying at least the first encoding type;

iii. an output coupled to said processing unit for releasing the link message reply signals for transmission to the plurality of media signal sources.

39. A conference bridge for managing a conference between a plurality of media signal sources generating media data packets conveying encoded media information and encoding type information, said conference bridge comprising:
  a) a memory element suitable for storing a plurality of records, each record being associated with a media signal source part of the conference, each record declaring at least one encoding type supported by the associated media signal source;
  b) an input for receiving media data packets from the plurality media signal sources, each media data packet including:
    i. a content portion indicative of encoded media information;
    ii. an encoding type portion declaring at least one encoding type associated with the content portion of the media data packet;
  c) a processing unit coupled to said input and to said memory unit, said processing unit being operative for:
    i. processing the media data packets received at said input to select at least one active media signal sources within the conference on the basis of the content portions of the media data packets, the at least one active media signal source having transmitted at least one given media data packet;
  d) an output for releasing the given media data packet for transmission to at least some media signal sources in the plurality of media signal sources.

40. A conference as described in claim 39, said processing unit being operative for processing the at least one given media data packet associated with the at least one active media signal source to select a subset of media signal sources within the conference at least in part on the basis of the encoding type portion of the at least one given media data packet and the plurality of records in said memory unit, each media signal source in the subset of media signal sources supporting an encoding type declared in the encoding type portion of the at least one given media data packet, said output being operative for releasing the given media data packet for transmission to media signal sources in the subset of media signal sources.

41. A method for managing a conference between a plurality of media signal sources generating media data packets conveying encoded media information and encoding type information, said method comprising:
  a) providing a memory element suitable for storing a plurality of records, each record being associated with a media signal source part of a conference, each record declaring at least one encoding type supported by the associated media signal source;
  b) receiving media data packets from the plurality media signal sources, each media data packet including:
    i. a content portion indicative of encoded media information;
    ii. an encoding type portion declaring at least one encoding type associated with the content portion of the media data packet;
  c) processing the media data packets received in b) to select at least one active media signal source within the conference on the basis of the content portions of the media data packets, the at least one active media signal source having transmitted at least one given media data packet;
  d) releasing the given media data packet for transmission to at least some media signal sources in the plurality of media signal sources.

42. A method as defined in claim 41, said method comprising:
  a) processing the at least one given media data packet associated with the at least one active media signal source to select a subset of media signal sources within the conference at least in part on the basis of the encoding type portion of the at least one given media data packet and the plurality of records in said memory unit, each media signal source in the subset of media signal sources supporting an encoding type declared in the encoding type portion of the at least one given media data packet;
  b) releasing the given media data packet for transmission to media signal sources in the subset of media signal sources.

43. A computer readable medium including a program element suitable for execution by a computing apparatus for managing a conference between a plurality of media signal sources generating media data packets conveying encoded media information and encoding type information, said computing apparatus comprising:
  a) a memory element suitable for storing a plurality of records, each record being associated with a media signal source part of a conference, each record declaring at least one encoding type supported by the associated media signal source;
  b) a processor operatively connected to said memory unit, said program element when executing on said processor being operative for:
    i. receiving media data packets from the plurality media signal sources, each media data packet including:
      (a) a content portion indicative of encoded media information;
      (b) an encoding type portion declaring at least one encoding type associated with the content portion of the media data packet;
    ii. processing the media data packets received in i. to select at least one active media signal source within the conference on the basis of the content portions of the media data packets, the at least one active media signal source having transmitted at least one given media data packet;
    iii. releasing the given media data packet for transmission to at least some media signal sources in the plurality of media signal sources.

44. A computer readable medium as described in claim 43, wherein said program element when executing on said processor being operative for:
  a) processing the at least one given media data packet associated with the at least one active media signal source to select a subset of media signal sources within the conference at least in part on the basis of the encoding type portion of the at least one given media data packet and the plurality of records in said memory unit, each media signal source in the subset of media signal sources supporting an encoding type declared in the encoding type portion of the at least one given media data packet;
  b) releasing the given media data packet for transmission to media signal sources in the subset of media signal sources.

45. A conference bridge suitable for managing a conference between a plurality of media signal sources generating media data packets conveying encoded media information and encoding type information, said conference bridge comprising:
- a) means for receiving a plurality of link messages for joining a conference, each link message being associated with a respective media signal source of the plurality of media signal sources, each link message including a data element from which can be derived at least one encoding type that the associated media signal source can support during decoding of encoded media information;
- b) means for processing the data elements in the plurality of link messages to derive:
  - (a) a first encoding type supported by each media signal source of the plurality of media signal sources;
  - (b) a second encoding type different from the first encoding type supported by at least two media signal sources from the plurality of media signal sources and unsupported by at least one of the media signal sources from the plurality of media signal sources;
- c) means for generating a link message reply signal for transmission to each media signal source of the plurality of media signal sources, the link message reply signals for transmission to the at least two media signal sources supporting the second encoding type conveying the first encoding type and the second encoding type, the link message reply signals for transmission to the media signal sources other than the at least two media signals sources conveying at least the first encoding type;
- d) means for releasing the link message reply signals for transmission to the plurality of media signal sources.

46. A media signal source suitable for generating media data packets conveying encoded media information and encoding type information, said media signal source supporting a plurality of encoding types, said media signal source including:
- a) means for generating a link message indicative of a desire of joining a given conference, the link message including a data element from which can be derived the plurality of encoding types that said media signal source can support;
- b) means for releasing the link message for transmission to a conference bridge;
- c) means for receiving a link message reply signal from the conference bridge, the link message reply signal conveying a set of selected encoding types, the set of selected encoding types including at least one encoding type;
- d) means for processing the link message reply signal to render active a subset of encoding types in the plurality of encoding types supported by said media signal source on the basis of the set of selected encoding types conveyed by the link message reply signal, thereby causing said media signal source to generate media data packets conveying encoded media information and encoding type information using the subset of encoding types of said set of selected encoding types conveyed by the link message reply signal.

47. A media signal source suitable for generating media data packets conveying encoded media information and encoding type information, said media signal source being suitable for use in a conferencing system including a conference bridge and a plurality of other media signal sources, said media signal source including:
- a) a first input for receiving a plurality of successive segments of a media data signal;
- b) a second input suitable for receiving a plurality of media data packets from the conference bridge;
- c) a processing unit coupled to said first input and said second input, said processing unit being operative for:
  - i. generating a plurality of successive media data packets on the basis plurality of said plurality successive segments of a media data signal;
  - ii. processing the plurality of successive media data packets generated in i. on the basis of the plurality of media data packets received at said second input to identify at least one media data packet in said plurality of successive media data packets unlikely to be retransmitted by said conference bridge;
- an output for releasing to the conference bridge the plurality of successive media data packets except the at least one media data packet identifies as being unlikely to be retransmitted by said conference bridge.

* * * * *